(12) United States Patent
Kamiya

(10) Patent No.: US 10,983,015 B2
(45) Date of Patent: Apr. 20, 2021

(54) FORCE DETECTING DEVICE AND ROBOT

(71) Applicant: Seiko Epson Corporation, Tokyo (JP)

(72) Inventor: Toshiyuki Kamiya, Suwa (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/724,474

(22) Filed: Dec. 23, 2019

(65) Prior Publication Data
US 2020/0209077 A1  Jul. 2, 2020

(30) Foreign Application Priority Data

Dec. 26, 2018  (JP) .............................. JP2018-243486

(51) Int. Cl.
*G01L 1/00* (2006.01)
*G01L 1/16* (2006.01)
*B25J 19/02* (2006.01)

(52) U.S. Cl.
CPC .............. *G01L 1/16* (2013.01); *B25J 19/028* (2013.01)

(58) Field of Classification Search
CPC ................................. G01L 1/16; B25J 19/028
USPC ..................................................... 73/962.625
See application file for complete search history.

(56) References Cited

U.S. PATENT DOCUMENTS

| | | | | |
|---|---|---|---|---|
| 5,402,684 A | * | 4/1995 | Engeler | G01L 5/167 |
| | | | | 73/794 |
| 5,591,945 A | * | 1/1997 | Kent | G06F 3/0418 |
| | | | | 178/18.04 |
| 2013/0112010 A1 | * | 5/2013 | Matsumoto | G01L 5/167 |
| | | | | 73/862.044 |
| 2014/0236354 A1 | | 8/2014 | Kamiya et al. | |
| 2015/0120051 A1 | * | 4/2015 | Matsuzawa | H01L 41/1132 |
| | | | | 700/258 |
| 2015/0120052 A1 | | 4/2015 | Mizushima et al. | |
| 2015/0127159 A1 | * | 5/2015 | Kamiya | G01P 15/18 |
| | | | | 700/258 |
| 2018/0313705 A1 | | 11/2018 | Kamiya | |
| 2019/0001511 A1 | | 1/2019 | Kawai | |
| 2019/0263000 A1 | * | 8/2019 | Miyasaka | B25J 13/085 |
| 2019/0263008 A1 | * | 8/2019 | Komatsu | G01L 5/167 |

FOREIGN PATENT DOCUMENTS

| | | |
|---|---|---|
| JP | S61-122539 A | 6/1986 |
| JP | H10-142084 A | 5/1998 |
| JP | 2014-163870 A | 9/2014 |
| JP | 2017-198705 A | 11/2017 |
| JP | 2018-189385 A | 11/2018 |
| JP | 2019-012013 A | 1/2019 |

* cited by examiner

*Primary Examiner* — Max H Noori
(74) *Attorney, Agent, or Firm* — Harness, Dickey & Pierce, P.L.C.

(57) ABSTRACT

A force detecting device having a first axis and a second axis orthogonal to each other, the first axis being a force detection axis, the force detecting device including a laminated body formed by laminating a first electrode, a first quartz plate, a second electrode, a second quartz plate, a third electrode, a third quartz plate, a fourth electrode, a fourth quartz plate, and a fifth electrode in this order and a force detection circuit configured to detect a force in a direction of the first axis based on an electric charge output from the second electrode and an electric charge output from the fourth electrode.

5 Claims, 15 Drawing Sheets

FORCE DETECTING DEVICE AND ROBOT

The present application is based on, and claims priority from JP Application Serial Number 2018-243486, filed Dec. 26, 2018, the disclosure of which is hereby incorporated by reference herein in its entirety.

BACKGROUND

1. Technical Field

The present disclosure relates to a force detecting device and a robot.

2. Related Art

A force sensor described in JP A-61-122539 (Patent Literature 1) has been known as a force detecting device that detects a received force. The force sensor described in Patent Literature 1 includes a sensor base, a distal end section coupled to the sensor base via a square pyramid surface, a holding section that holds the distal end section while pressing the distal end section against the sensor base with a fixed force in advance, four contact pressure sensors provided between the sensor base and the square pyramid surface of the distal end section, and an arithmetic processing section that processes signals output from the contact pressure sensors. Such a force sensor is capable of detecting both of a force in the vertical direction and a force in the horizontal direction applied to the distal end section.

On the other hand, a type of the contact pressure sensors is not particularly described in Patent Literature 1. However, in recent years, a quartz piezoelectric sensor including a quartz piezoelectric element has been sometimes used because the quartz piezoelectric sensor has excellent characteristics.

However, in the quartz piezoelectric element, since an electric charge output from quartz is feeble, the influence of output drifts due to a leak current of a conversion circuit, which converts the electric charge into a voltage, cannot be neglected. There has been known, for example, a configuration in which quartz piezoelectric sensors calculate a difference between output signals in order to reduce the output drifts. With such a configuration, since the output drifts can be offset, it is possible to improve detection accuracy of the force sensor.

However, when a plurality of quartz piezoelectric sensors are provided, an increase in the size of the force sensor is inevitable. In particular, when force detection in multiple axes is unnecessary, a one-axis force sensor that can be reduced in cost is desired. In particular, there is a strong demand for a reduction in the size of such a one-axis force sensor. However, when the one-axis force sensor includes the plurality of quartz piezoelectric sensors, a sufficient reduction in size cannot be achieved. Therefore, there is a demand for a force detecting device that has high detection accuracy and can be reduced in size.

SUMMARY

A force detecting device according to an application example of the present disclosure is a force detecting device having a first axis and a second axis orthogonal to each other, the first axis being a force detection axis, the force detecting device including: a laminated body formed by laminating a first electrode, a first quartz plate, which is a Y-cut quartz plate, a second electrode, a second quartz plate, which is a Y-cut quartz plate, a third electrode, a third quartz plate, which is a Y-cut quartz plate, a fourth electrode, a fourth quartz plate, which is a Y-cut quartz plate, and a fifth electrode in this order; and a force detection circuit configured to detect a force in a direction of the first axis based on an electric charge output from the second electrode and an electric charge output from the fourth electrode. A +X direction of the first quartz plate and a +X direction of the second quartz plate face opposite directions. A +X direction of the third quartz plate and a +X direction of the fourth quartz plate face opposite directions. An angle formed by the +X direction of the second quartz plate and one direction of the first axis and an angle formed by the +X direction of the fourth quartz plate and the one direction of the first axis are different. An angle formed by the +X direction of the second quartz plate and one direction of the second axis and an angle formed by the +X direction of the fourth quartz plate and the one direction of the second axis are equal.

DESCRIPTION OF EXEMPLARY EMBODIMENTS

A force detecting device and a robot according to the present disclosure are explained in detail below based on preferred embodiments shown in the accompanying drawings.

First Embodiment

Figure 1:
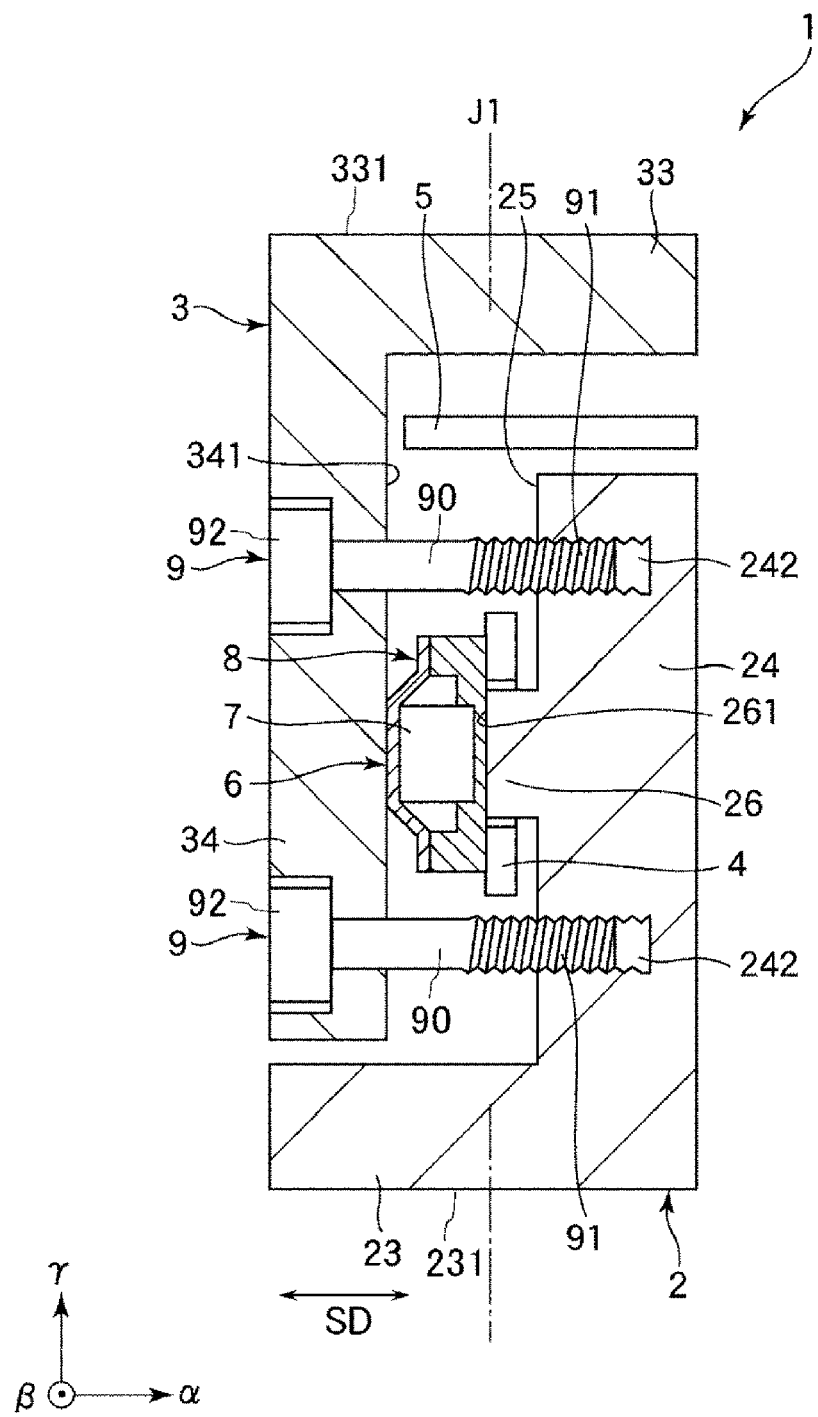
FIG. 1 is a longitudinal sectional view showing a force detecting device according to a first embodiment.
Figure 2:
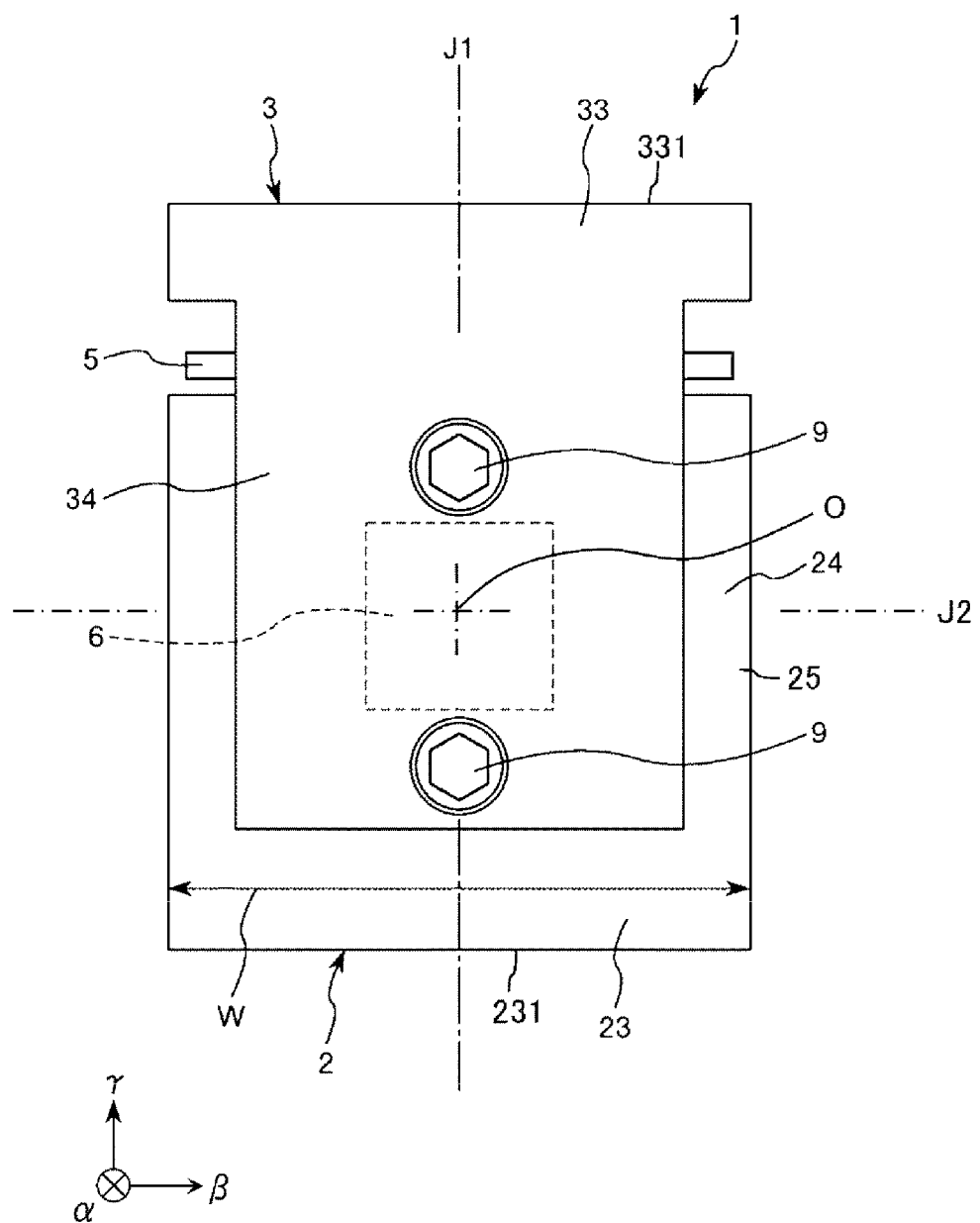
FIG. 2 is a side view of the force detecting device shown in FIG. 1.
Figure 3:
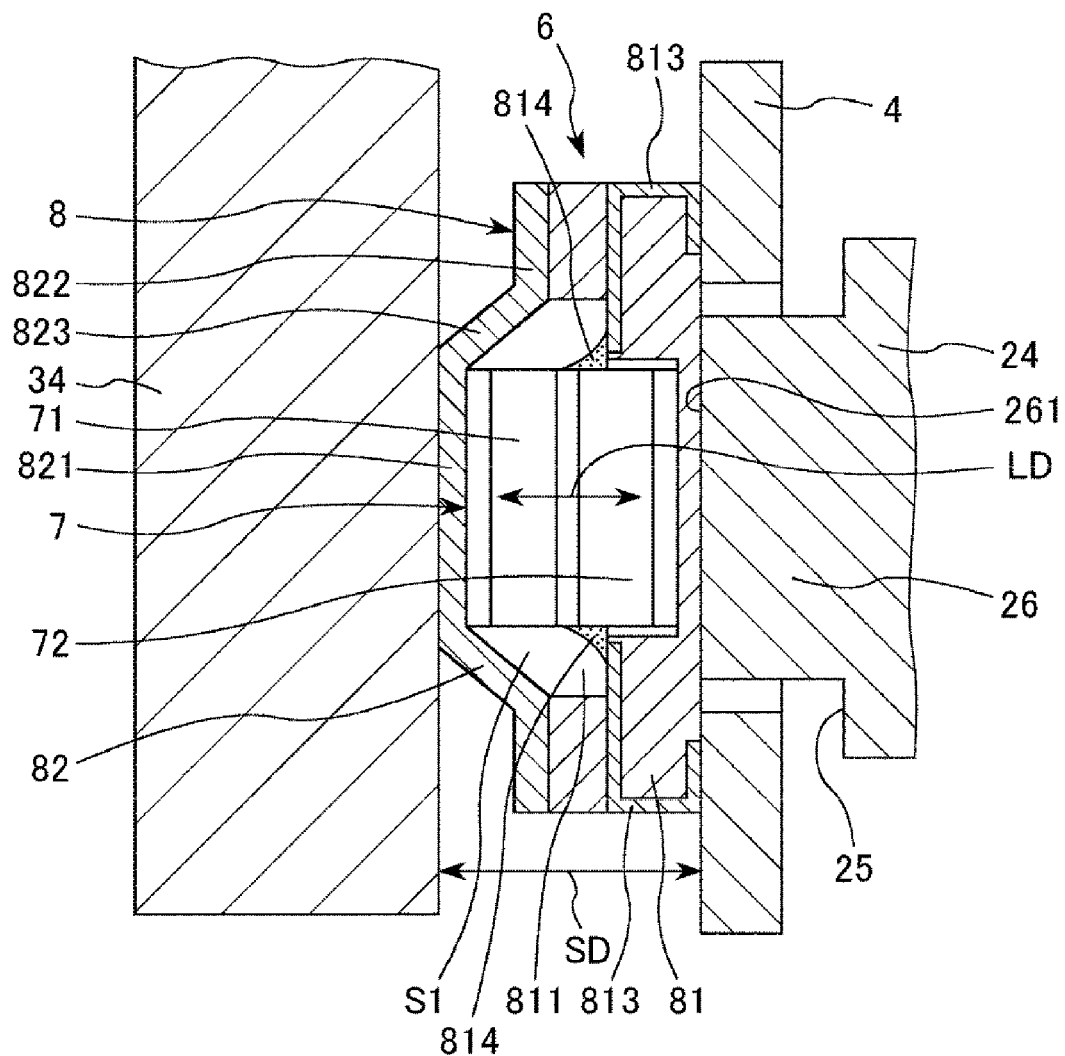
FIG. 3 is a sectional view showing a piezoelectric sensor section included in the force detecting device shown in FIG. 1.
Figure 4:
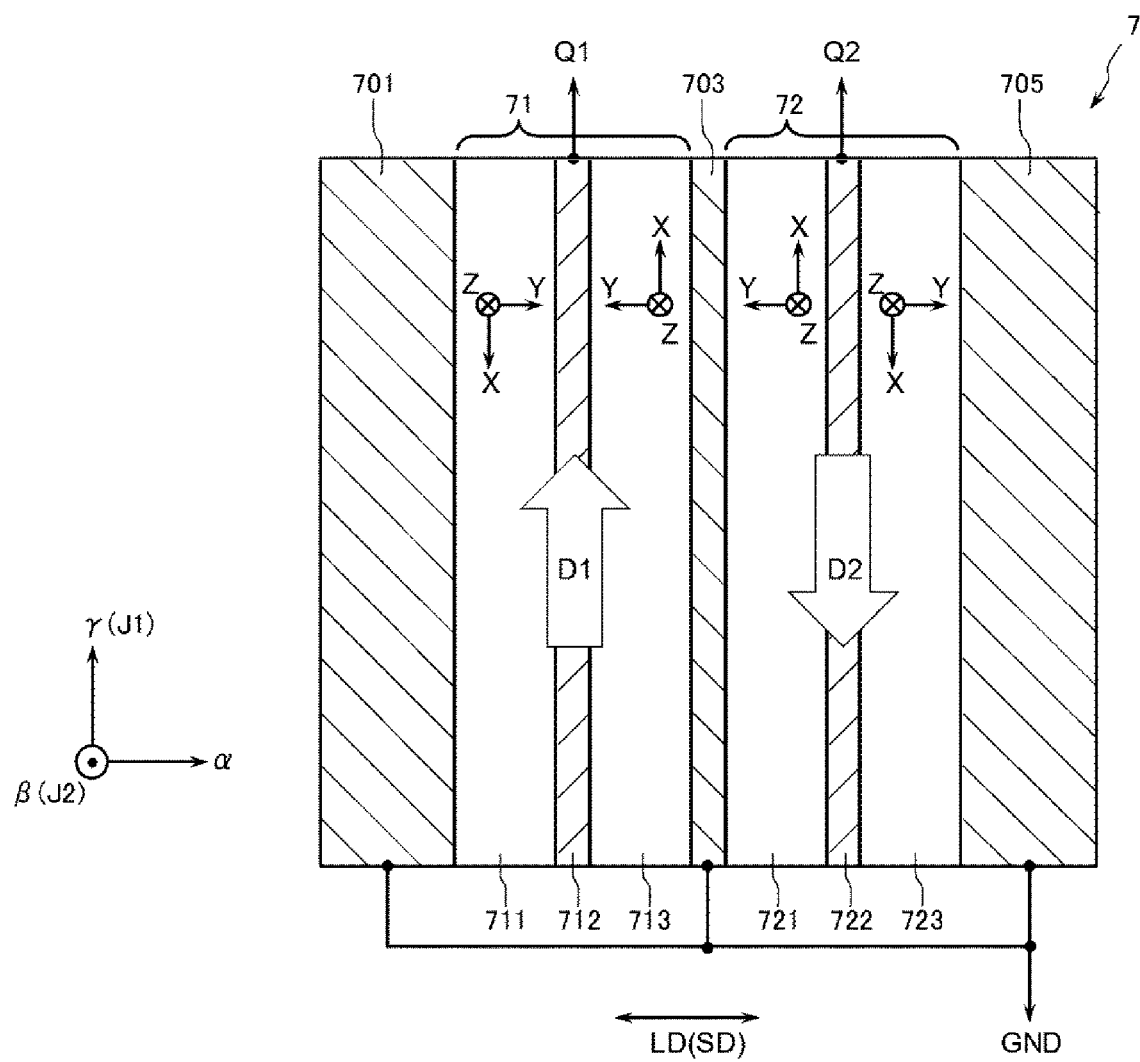
FIG. 4 is a sectional view showing a piezoelectric sensor element included in the piezoelectric sensor section shown in FIG. 3.
Figure 5:
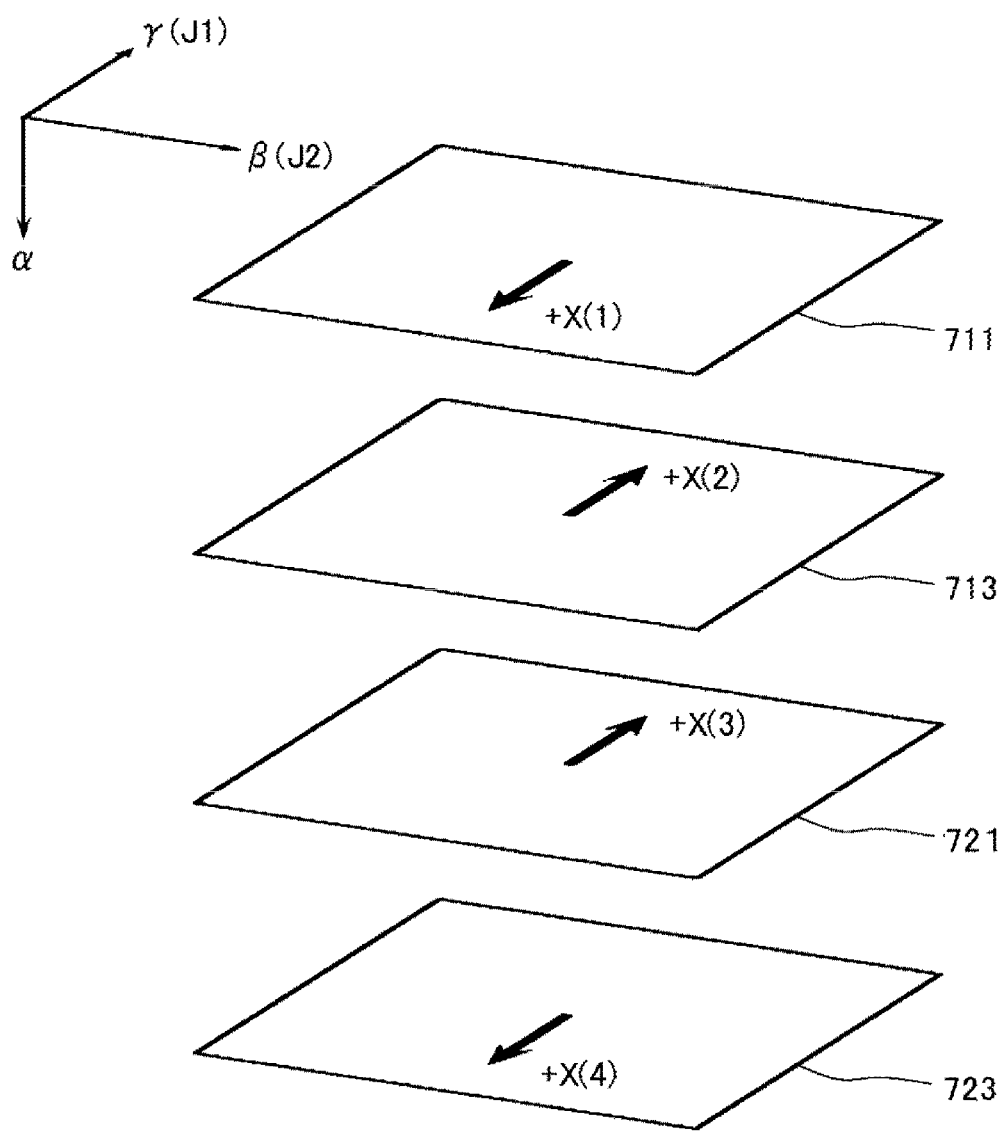
FIG. 5 is an exploded perspective view of the piezoelectric sensor element shown in FIG. 4.
Figure 6:
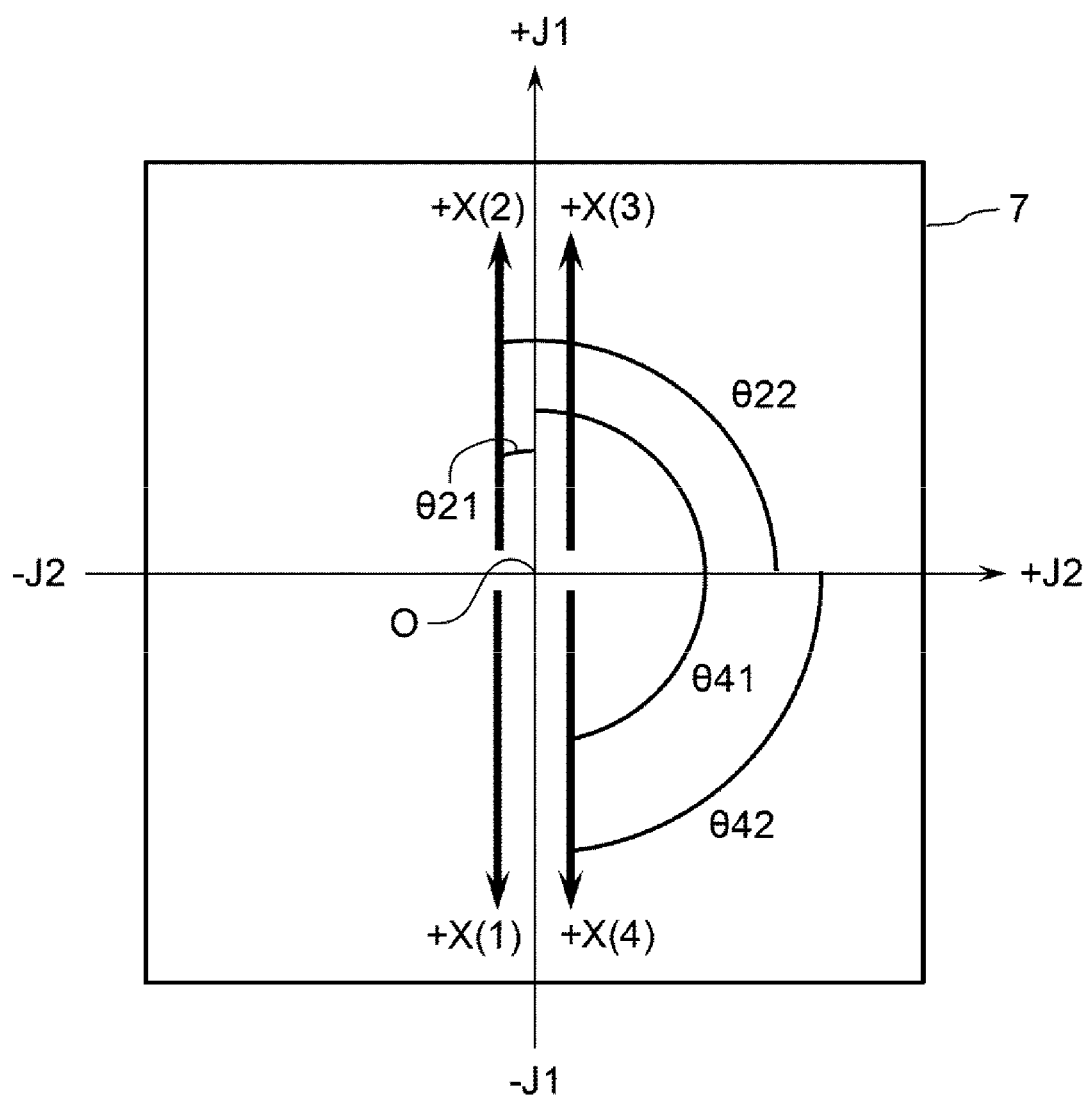
FIG. 6 is a schematic diagram of the piezoelectric sensor element shown in FIG. 5.
Figure 7:
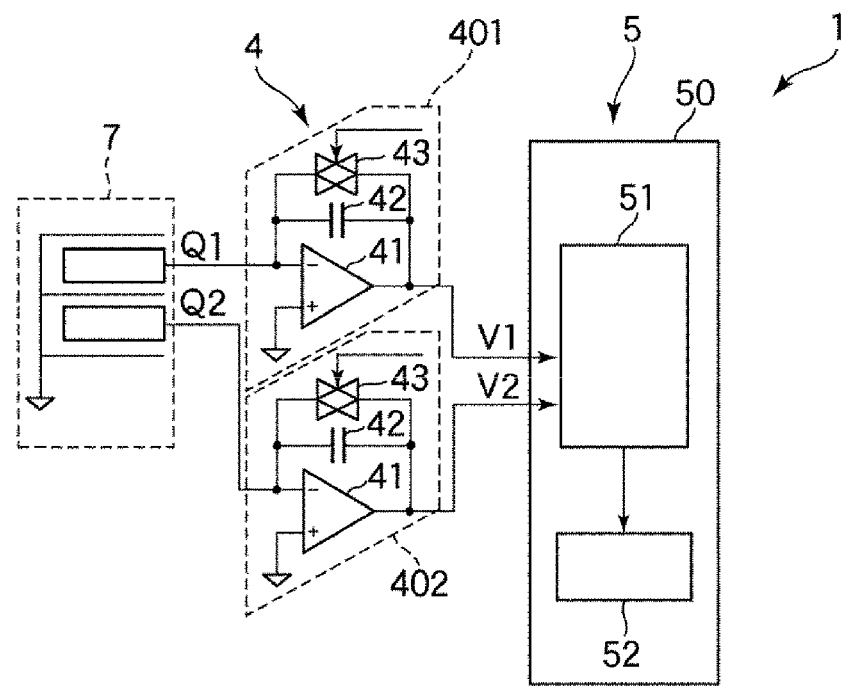
FIG. 7 is a circuit diagram showing a circuit system of the force detecting device shown in FIG. 1.

FIG. 1 is a longitudinal sectional view showing a force detecting device according to a first embodiment. FIG. 2 is a side view of the force detecting device shown in FIG. 1. FIG. 3 is a sectional view showing a piezoelectric sensor section included in the force detecting device shown in FIG. 1. FIG. 4 is a sectional view showing a piezoelectric sensor element included in the piezoelectric sensor section shown in FIG. 3. FIG. 5 is an exploded perspective view of the piezoelectric sensor element shown in FIG. 4. FIG. 6 is a schematic diagram of the piezoelectric sensor element shown in FIG. 5. FIG. 7 is a circuit diagram showing a circuit system of the force detecting device shown in FIG. 1. In the following explanation, the upper side in FIGS. 1 and 2 is also referred to as "upper" and the lower side in FIGS. 1 and 2 is referred to as "lower" as well. As shown in FIGS. 1, 2, and 3, three axes orthogonal to one another are represented as an αaxis, a β axis, and a γ axis. A direction parallel to the αaxis is referred to as "α-axis direction" as well, a direction parallel to the β axis is referred to as "β-axis direction" as well, and a direction parallel to the γ axis is referred to as "γ-axis direction" as well.

A force detecting device 1 shown in FIG. 1 is a one-axis force detecting device that can detect a translational force component in the γ-axis direction.

As shown in FIG. 1, the force detecting device 1 includes a first base 2 functioning as a base plate, a second base 3 disposed a predetermined interval apart from the first base 2 and functioning as a cover plate opposed to the first base 2, an analog circuit board 4 disposed between the first base 2 and the second base 3, a digital circuit board 5 disposed between the first base 2 and the second base 3 and electrically coupled to the analog circuit board 4, a piezoelectric sensor section 6 mounted on the analog circuit board 4 and configured to output a signal according to an applied external force, and two pre-compressing bolts 9 functioning as fixing members.

The first base 2 includes a tabular bottom plate 23 and a wall section 24 erected from the bottom plate 23 upward, that is, toward the normal direction of the bottom plate 23. As explained below, a lower surface 231 of the bottom plate 23 functions as an attachment surface to a robot 100 when the force detecting device 1 is fixed to the robot 100 and used. A plan view shape of the bottom plate is not particularly limited and may be, for example, besides a circle and a square, a polygon other than the square.

In the following explanation, an axis passing the center of the lower surface 231 and parallel to the normal of the lower surface 231 is represented as a "first axis J1". The first axis J1 is parallel to the γ axis as well. In this embodiment, an extending direction of the first axis J1 is represented as a first axis J1 direction, an upward direction in FIG. 2 is represented as a "+J1 direction" of the first axis J1, and a downward direction of FIG. 2 is represented as a "−J1 direction" of the first axis J1.

The wall section 24 is disposed at an edge portion of the bottom plate 23 and disposed to project upward from the edge portion. The wall section 24 has a square external shape when viewed from the α-axis direction and is formed in a tabular shape having two principal planes, normals of which are the αaxis. Of the two principal planes, on an inner surface 25 facing the second base 3 side, a projection 26 projecting in the normal direction of the inner surface 25 is disposed. A top surface 261 of the projection 26 is formed by a plane perpendicular to the lower surface 231 of the bottom plate 23. However, the direction of the top surface 261 is not particularly limited. The top surface 261 may be inclined with respect to the plane perpendicular to the lower surface 231.

The second base 3 includes a tabular top plate 33 and a wall section 34 erected from the top plate 33 downward, that is, toward the normal direction of the top plate 33. As explained below, an upper surface 331 of the top plate 33 functions as an attachment surface to the robot 100 when the force detecting device 1 is fixed to the robot 100 and used. In a natural state in which an external force is not applied, the upper surface 331 of the top plate 33 is parallel to the lower surface 231 of the bottom plate 23. However, the upper surface 331 and the lower surface 231 may be nonparallel in the natural state. A plan view shape of the top plate 33 is substantially the same as the plan view shape of the bottom plate 23. However, the plan view shape of the top plate 33 is not particularly limited and may be, for example, besides a circle and a square, a polygon other than the square. The plan view shape of the top plate 33 may be different from the plan view shape of the bottom plate 23.

The wall section 34 is disposed at an edge portion of the top plate 33 and disposed to project downward from the edge portion. The wall section 34 is disposed to be opposed to the projection 26 to be paired with the projection 26. Further, the wall section 34 has a square external shape when viewed from the α-axis direction and is formed in a tabular shape having two principal planes, normals of which are the αaxis. Of the two principal planes, an inner surface 341 facing the first base 2 side is parallel to the top surface 261 of the projection 26. The piezoelectric sensor section 6 is held between the inner surface 341 of the wall section 34 and the top surface 261 of the projection 26. In the following explanation, a direction in which the piezoelectric sensor section 6 is held, that is, a direction in which the inner surface 341 and the top surface 261 are arranged side by side is referred to as "holding direction SD" as well.

When viewed from the α-axis direction, as shown in FIG. 2, the first axis J1 passes a center O of the piezoelectric sensor section 6. Further, an axis orthogonal to the first axis J1 in the center O in a surface parallel to the inner surface 341 and the top surface 261 is represented as a "second axis J2". The second axis J2 is parallel to the β axis. In this embodiment, an extending direction of the second axis J2 is represented as a second axis J2 direction, the right direction of FIG. 2 is represented as a "+J2 direction" of the second axis J2, and the left direction of FIG. 2 is represented as a "−J2 direction" of the second axis J2.

The first base 2 and the second base 3 are explained above. A constituent material of the first base 2 and the second base 3 is not particularly limited bus is desirably a hard material. Examples of such a material include various kinds of metal such as iron, nickel, cobalt, gold, platinum, silver, copper, manganese, aluminum, magnesium, zinc, lead, tin, titanium, and tungsten, alloys and intermetallic compounds including at least one of these kinds of metal, and oxides, nitrides, and carbides of these kinds of metal.

The piezoelectric sensor section 6 is explained. The piezoelectric sensor section 6 has a function of outputting two electric charges Q1 and Q2 according to an external force applied along the first axis J1, that is, the γ axis. As shown in FIG. 3, the piezoelectric sensor section 6 includes a piezoelectric sensor element 7 and a package 8 that houses the piezoelectric sensor element 7.

As shown in FIG. 4, the piezoelectric sensor element 7 includes a first electrode 701, a third electrode 703, and a fifth electrode 705 coupled to a ground GND, a first sensor 71 that outputs the electric charge Q1 according to an external force parallel to the γ axis, that is, a shearing force in the γ-axis direction, and a second sensor 72 that outputs the electric charge Q2 according to the shearing force in the γ-axis direction. The first electrode 701, the first sensor 71, the third electrode 703, the second sensor 72, and the fifth electrode 705 are laminated in this order in a laminating direction LD.

The first sensor 71 is configured to output positive electric charges or negative electric charges according to an external force applied in the γ-axis direction. Specifically, the first sensor 71 includes a first quartz plate 711, a second quartz plate 713 disposed to be opposed to the first quartz plate 711, and a second electrode 712 provided between the first quartz plate 711 and the second quartz plate 713.

The first quartz plate 711 is a Y-cut quartz plate and has an X axis, a Y axis, and a Z axis, which are crystal axes orthogonal to one another. The X axis, the Y axis, and the Z axis are respectively an electrical axis, a mechanical axis, and an optical axis of quartz. The Y axis is an axis extending along the thickness direction of the first quartz plate 711. The X axis is an axis extending along the up-down direction in FIG. 4. The Z axis is an axis extending along the paper surface depth direction in FIG. 4. In a configuration shown in FIG. 4, concerning the X axis, the lower side in FIG. 4 is represented as a +X direction and the opposite side of the +X direction is represented as a −X direction. Concerning the Y axis, the right side in FIG. 4 is represented as a +Y direction and the opposite side of the +Y direction is represented as a −Y direction. Concerning the Z axis, the paper surface depth side in FIG. 4 is represented as a +Z direction and the opposite side of the +Z direction is represented as a −Z direction.

The first quartz plate 711 formed of quartz has excellent characteristics such as a wide dynamic range, high rigidity, a high natural frequency, and high load resistance.

The Y-cut quartz plate is, as described in JIS C6704:2009, a quartz plate having a surface perpendicular to the Y axis (the mechanical axis) of quartz. The Y axis is the thickness direction of the Y-cut quartz plate. However, the "Y-cut quartz plate" according to this embodiment includes, besides the quartz plate in which the thickness direction and the Y axis coincide, a quartz plate in which the Y axis is inclined with respect to the thickness direction slightly, for example, approximately less than 10°. In this embodiment, an electrode is disposed on a Y-cut surface of the Y-cut quartz plate.

The Y-cut quartz plate generates electric charges in response to an external force, that is, a shearing force applied along the surface direction of the Y-cut quartz plate. When an external force in the +X direction is applied to the surface of the first quartz plate 711, electric charges are induced in the first quartz plate 711 by a piezoelectric effect. As a result, positive electric charges gather near the surface on the second electrode 712 side of the first quartz plate 711 and negative electric charges gather near the surface on the first electrode 701 side of the first quartz plate 711. Similarly, when an external force in the −X direction is applied to the surface of the first quartz plate 711, negative electric charges gather near the surface on the second electrode 712 side of the first quartz plate 711 and positive electric charges gather near the surface on the first electrode 701 side of the first quartz plate 711.

The second quartz plate 713 is also a Y-cut quartz plate and has an X axis, a Y axis, and a Z axis, which are crystal axes orthogonal to one another. The X axis, the Y axis, and the Z axis are respectively an electrical axis, a mechanical axis, and an optical axis of quartz. The Y axis is an axis extending along the thickness direction of the second quartz plate 713. The X axis is an axis extending along the up-down direction in FIG. 4. The Z axis is an axis extending along the paper surface depth direction in FIG. 4. In the configuration shown in FIG. 4, concerning the X axis, the upper side in FIG. 4 is represented as a +X direction and the opposite side of the +X direction is represented as a −X direction. Concerning the Y axis, the left side in FIG. 4 is represented as a +Y direction and the opposite side of the +Y direction is represented as a −Y direction. Concerning the Z axis, the paper surface depth side in FIG. 4 is represented as a +Z direction and the opposite side of the +Z direction is represented as a −Z direction.

The second quartz plate 713 formed of quartz also has excellent characteristics such as a wide dynamic range, high rigidity, a high natural frequency, and high load resistance.

When an external force in the +X direction is applied to the surface of the second quartz plate 713, electric charges are induced in the second quartz plate 713 by the piezoelectric effect. As a result, positive electric charges gather near the surface on the second electrode 712 side of the second quartz plate 713 and negative electric charges gather near the surface on the third electrode 703 side of the second quartz plate 713. Similarly, when an external force in the −X direction is applied to the surface of the second quartz plate 713, negative electric charges gather near the surface on the second electrode 712 side of the second quartz plate 713 and positive electric charges gather near the surface on the third electrode 703 side of the second quartz plate 713.

In the configuration of the first sensor 71 including the first quartz plate 711 and the second quartz plate 713, compared with a configuration including only one of the first quartz plate 711 and the second quartz plate 713, the positive electric charges or the negative electric charges gathering near the second electrode 712 can be increased. As a result, the electric charge Q1 output from the second electrode 712 can be increased.

The second electrode 712 has a function of outputting, as the electric charge Q1, the positive electric charges or the negative electric charges generated in the first quartz plate 711 and the second quartz plate 713. As explained above, when an external force in the +X direction is applied to the surface of the first quartz plate 711 or the surface of the second quartz plate 713, the positive electric charges gather near the second electrode 712. As a result, a positive electric charge Q1 is output from the second electrode 712. On the other hand, when an external force in the −X direction is applied to the surface of the first quartz plate 711 or the surface of the second quartz plate 713, the negative electric charges gather near the second electrode 712. As a result, a negative electric charge Q1 is output from the second electrode 712. Therefore, the first sensor 71 has a force detecting direction D1 in the +J1 direction of the first axis J1.

The second sensor 72 is configured to output positive electric charges or negative electric charges according to an external force in the γ-axis direction. Specifically, the second sensor 72 includes a third quartz plate 721, a fourth quartz plate 723 disposed to be opposed to the second quartz plate 713, and a fourth electrode 722 provided between the third quartz plate 721 and the fourth quartz plate 723.

The third quartz plate 721 is a Y-cut quartz plate and has an X axis, a Y axis, and a Z axis, which are crystal axes orthogonal to one another. The X axis, the Y axis, and the Z axis are respectively an electrical axis, a mechanical axis, and an optical axis of quartz. The Y axis is an axis extending along the thickness direction of the third quartz plate 721. The X axis is an axis extending along the up-down direction in FIG. 4. The Z axis is an axis extending along the paper surface depth direction in FIG. 4. In the configuration shown in FIG. 4, concerning the X axis, the upper side in FIG. 4 is represented as a +X direction and the opposite side of the +X direction is represented as a −X direction. Concerning the Y axis, the left side in FIG. 4 is represented as a +Y direction and the opposite side of the +Y direction is represented as a −Y direction. Concerning the Z axis, the paper surface depth side in FIG. 4 is represented as a +Z direction and the opposite side of the +Z direction is represented as a −Z direction.

The third quartz plate 721 formed of quartz has excellent characteristics such as a wide dynamic range, high rigidity, a high natural frequency, and high load resistance.

The Y-cut quartz plate generates electric charges in response to an external force, that is, a shearing force applied along the surface direction of the Y-cut quartz plate. When an external force in the +X direction is applied to the surface of the third quartz plate 721, electric charges are induced in the third quartz plate 721 by the piezoelectric effect. As a result, negative electric charges gather near the surface on the fourth electrode 722 side of the third quartz plate 721 and positive electric charges gather near the surface on the third electrode 703 side of the third quartz plate 721. Similarly, when an external force in the −X direction is applied to the surface of the third quartz plate 721, positive electric charges gather near the surface on the fourth electrode 722 side of the third quartz plate 721 and negative electric charges gather near the surface on the third electrode 703 side of the third quartz plate 721.

The fourth quartz plate 723 is also a Y-cut quartz plate and has an X axis, a Y axis, and a Z axis, which are crystal axes orthogonal to one another. The Y axis is an axis extending along the thickness direction of the fourth quartz plate 723. The X axis is an axis extending along the up-down direction in FIG. 4. The Z axis is an axis extending along the paper surface depth direction in FIG. 4. In the configuration shown in FIG. 4, concerning the X axis, the lower side in FIG. 4 is represented as a +X direction and the opposite side of the +X direction is represented as a −X direction. Concerning the Y axis, the right side in FIG. 4 is represented as a +Y direction and the opposite side of the +Y direction is represented as a −Y direction. Concerning the Z axis, the paper surface depth side in FIG. 4 is represented as a +Z direction and the opposite side of the +Z direction is represented as a −Z direction.

The fourth quartz plate 723 formed of quartz also has excellent characteristics such as a wide dynamic range, high rigidity, a high natural frequency, and high load resistance.

When an external force in the +X direction is applied to the surface of the fourth quartz plate 723, electric charges are induced in the fourth quartz plate 723 by the piezoelectric effect. As a result, negative electric charges gather near the surface on the fourth electrode 722 side of the fourth quartz plate 723 and positive electric charges gather near the surface on the fifth electrode 705 side of the fourth quartz plate 723. Similarly, when an external force in the −X direction is applied to the surface of the fourth quartz plate 723, positive electric charges gather near the surface on the fourth electrode 722 side of the fourth quartz plate 723 and negative electric charges gather near the surface on the fifth electrode 705 side of the fourth quartz plate 723.

In the configuration of the second sensor 72 including the third quartz plate 721 and the fourth quartz plate 723, compared with a configuration including only one of the third quartz plate 721 and the fourth quartz plate 723, the positive electric charges or the negative electric charges gathering near the fourth electrode 722 can be increased. As a result, the electric charge Q2 output from the fourth electrode 722 can be increased.

The fourth electrode 722 has a function of outputting, as the electric charge Q2, the positive electric charges or the negative electric charges generated in the third quartz plate 721 and the fourth quartz plate 723. As explained above, when an external force in the +X direction is applied to the surface of the second quartz plate 713 or the surface of the fourth quartz plate 723, the negative electric charges gather near the fourth electrode 722. As a result, a negative electric charge Q2 is output from the fourth electrode 722. On the other hand, when an external force in the −X direction is applied to the surface of the third quartz plate 721 or the surface of the fourth quartz plate 723, the positive electric charges gather near the fourth electrode 722. As a result, a positive electric charge Q2 is output from the fourth electrode 722. Therefore, the second sensor 72 has a force detecting direction D2 in the −J1 direction of the first axis J1.

The force detecting device 1 can detect a translational force component in the γ-axis direction, that is, the first axis J1 direction based on the electric charges Q1 and Q2 output from the piezoelectric sensor element 7.

The package 8 includes, as shown in FIG. 3, a base 81 including a recess 811 and a lid 82 joined to the base 81 to cover an opening of the recess 811 and functioning as a cover. An airtight housing space S1 is formed on the inner side of the package 8. The piezoelectric sensor element 7 is housed in the housing space S1. An atmosphere in the housing space S1 is not particularly limited. For example, inert gases such as nitrogen, argon, and helium can be filled in the housing space S1. Consequently, the atmosphere in the housing space S1 is stabilized. Deterioration, corrosion, and the like of an electrode can be suppressed. The housing space S1 may be in, for example, a vacuum state, that is, a state in which pressure is lower than the atmospheric pressure.

A constituent material of the base 81 is not particularly limited. For example, various ceramics such as aluminum oxide (alumina) and zirconium oxide (zirconia) can be used. For example, a bottom section of the base 81, that is, a portion where the piezoelectric element 7 is placed and a sidewall section of the base 81, that is, a portion erected from the outer edge portion of the bottom section may be made of different materials. In this case, the bottom section can be configured by various metal materials such as stainless steel, Kovar, copper, iron, and carbon steel. The sidewall section can be made of various ceramics. For example, a constituent material of the bottom section is desirably an alloy of Kovar or the like have a coefficient of thermal expansion close to the coefficient of thermal expansion of ceramics. Consequently, thermal distortion less easily occurs in the package 8. It is possible to reduce application of unnecessary stress, that is, an external force other than pre-compression and a force that should be detected to the piezoelectric sensor element 7.

As shown in FIG. 3, a terminal 813 connecting the inside and the outside of the housing space S1 is provided on the base 81. The terminal 813 and the piezoelectric sensor element 7 are electrically coupled via a coupling section 814. The coupling section 814 is not particularly limited. For example, conductive paste such as Ag paste, Cu paste, and Au paste can be used.

As shown in FIG. 3, the lid 82 includes a center portion 821 located in the center and in contact with the piezoelectric sensor element 7, an outer edge portion 822 located at the outer edge portion and joined to the base 81, and a tapered coupling section 823 located between the center portion 821 and the outer edge portion 822 and coupling the center portion 821 and the outer edge portion 822. The center portion 821 is provided to project from the outer edge portion 822.

A constituent material of the lid 82 is not particularly limited. The constituent material is desirably a member having a coefficient of linear expansion approximate to the coefficient of linear expansion of the constituent material of the base 81. For example, when the constituent material of the base 81 is the ceramics explained above, the constituent material of the lid 82 is desirably a metal material. Consequently, thermal distortion less easily occurs in the package 8. It is possible to reduce application of unnecessary stress, that is, an external force other than pre-compression and a force that should be detected to the piezoelectric sensor element 7. Therefore, the force detecting device 1 has higher force detection accuracy.

The piezoelectric sensor section 6 is explained above. The configuration of the piezoelectric sensor section 6 is not particularly limited. For example, the package 8 may be omitted.

As explained above, such a piezoelectric sensor section 6 is disposed between the wall section 34 and the projection 26 that are paired. The piezoelectric sensor section 6 is disposed to be sandwiched between the wall section 34 and the projection 26 with the bottom surface of the base 81 directed to the projection 26 side and with the lid 82 directed to the wall section 34 side. Therefore, the laminating direction LD of the first sensor 71, the second sensor 72, and the like in the piezoelectric sensor section 6 is parallel to the holding direction SD. However, the laminating direction LD may be slightly inclined with respect to the holding direction SD.

As shown in FIG. 1, the first base 2 and the second base 3 are coupled and fixed by the pre-compressing bolts 9. The piezoelectric sensor element 7 is pre-compressed by the pre-compressing bolts 9 to be compressed in the holding direction SD and the laminating direction LD. By pre-compressing the piezoelectric sensor element 7 in this way, an output at the time when an external force is applied is stabilized. The applied external force can be accurately detected.

Specifically, the pre-compressing bolts 9 include bar-like main body sections 90, head sections 92 disposed at the proximal ends of the main body sections 90, and screw sections 91 disposed in the main body sections 90. The head sections 92 are engaged with the wall section 34 of the second base 3. The screw sections 91 are screwed in the wall section 24 of the first base 2. Therefore, by tightening the pre-compressing bolts 9, the piezoelectric sensor element 7 located between the wall sections 24 and 34 can be pre-compressed to be compressed. That is, the screw sections 91 can be considered fastening sections that fasten the wall section 24 and the wall section 34.

The "fixing" by the pre-compressing bolts 9 is performed while allowing two fixing objects to move a predetermined amount from each other. That is, in a state in which the first base 2 and the second base 3 are fixed by the pre-compressing bolts 9, at least one of the first base 2 and the second base 3 can be displaced with respect to the other within a predetermined range. This makes it possible to more surely transmit a received external force to the piezoelectric sensor element 7.

In the configuration shown in FIG. 1, the two pre-compressing bolts 9 perform the pre-compression of the piezoelectric sensor section 6. The two pre-compressing bolts 9 are disposed on both sides of the piezoelectric sensor section 6 such that the piezoelectric sensor section corresponding to the two pre-compressing bolts 9 is located therebetween. This makes it possible to pre-compress the piezoelectric sensor section 6 from both sides in the γ-axis direction in a well-balanced manner.

In particular, in this embodiment, as shown in FIG. 2, the two pre-compressing bolts 9 corresponding to the piezoelectric sensor section 6 are disposed side by side along the direction of the first axis J1. Consequently, width W, that is, the length in the second axis J2 side of the force detecting device 1 decreases. Therefore, a small force detecting device 1 with a reduced planar expanse can be obtained. In this embodiment, the two pre-compressing bolts 9 corresponding to the piezoelectric sensor section 6 are disposed side by side along the direction of the first axis J1. However, not only this, but the two pre-compressing bolts 9 may be disposed side by side along any direction crossing the first axis J1.

As shown in FIG. 1, female screw sections 242 that screw with the screw sections 91 of the pre-compressing bolts 9 are provided in the wall section 24 of the first base 2. The pre-compressing bolts 9 are inserted into the first base 2 from the second base 3 side in a state in which the piezoelectric sensor section 6 is disposed between the first base 2 and the second base 3. The screw sections 91 of the pre-compressing bolts 9 are screwed in the female screw sections 242. Pressure, that is, pre-compression having predetermined magnitude is applied to the piezoelectric sensor element 7 in the holding direction SD. Consequently, when a shearing force acts on the piezoelectric sensor element 7, a frictional force is generated between piezoelectric substrates of the piezoelectric sensor element 7. Electric charges are more surely output from the piezoelectric sensor element 7. The magnitude of the pre-compression can be adjusted by adjusting a tightening amount of the pre-compressing bolts 9. A constituent material of the pre-compressing bolts 9 is not particularly limited. For example, various metal materials, various resin materials, and the like can be used.

In this embodiment, the screw sections 91 are illustrated as the fastening sections. However, the fastening sections only have to be able to apply a force to reduce the distance between the wall section 24 and the wall section 34. Therefore, the fastening sections are not limited to the screw sections 91 and may be elastic bodies such as rivets, clamps, springs, or resin.

The analog circuit board 4 and the digital circuit board 5 are explained. As shown in FIG. 1, the analog circuit board 4 and the digital circuit board 5 are respectively disposed between the first base 2 and the second base 3. Specifically, the analog circuit board 4 is disposed on the bottom surface of the package 8 of the piezoelectric sensor section 6. The analog circuit board 4 is disposed to avoid the projection 26, the package 8, the pre-compressing bolts 9, and the female screw sections 242 by, for example, forming a through-hole not to hinder the contact of the projection 26 and the package 8 and the screwing of the pre-compressing bolts 9 and the female screw sections 242. The digital circuit board 5 is disposed between the wall section 24 of the first base 2 and the top plate 33 of the second base 3. However, the disposition of the analog circuit board 4 and the digital circuit board 5 is not particularly limited. The analog circuit board 4 and the digital circuit board 5 may be disposed on the outer sides of the first base 2 and the second base 3. The analog circuit board 4 and the digital circuit board 5 may be omitted. In this case, for example, an external device to which the force detecting device 1 is coupled only has to include circuit sections having the same functions as the functions of the analog circuit board 4 and the digital circuit board 5.

As shown in FIG. 7, the analog circuit board 4 includes a conversion output circuit 401 that converts the electric charge Q1 output from the piezoelectric sensor element 7 into a voltage V1 and a conversion output circuit 402 that converts the electric charge Q2 output from the piezoelectric sensor element 7 into a voltage V2. Further, the conversion output circuits 401 and 402 respectively include operational amplifiers 41, capacitors 42, and switching elements 43.

The digital circuit board 5 includes a force detection circuit 50 that detects an applied external force. The force detection circuit 50 has a function of detecting the applied external force based on the voltage V1 output from the conversion output circuit 401 and the voltage V2 output from the conversion output circuit 402. As shown in FIG. 7, such a force detection circuit 50 includes an AD converter 51 coupled to the conversion output circuits 401 and 402 and an arithmetic operation section 52 coupled to the AD converter 51.

The AD converter 51 has a function of converting the voltages V1 and V2 from analog signals into digital signals. The voltages V1 and V2 converted into the digital signals by the AD converter 51 are input to the arithmetic operation section 52. The arithmetic operation section 52 detects a translational force component in the γ-axis direction based on the voltages V1 and V2 converted into the digital signals.

The number of the pre-compressing bolts 9 is not particularly limited and may be one or three or more. The disposition of the three or more pre-compressing bolts 9 is not particularly limited. However, all the pre-compressing bolts 9 are desirably disposed side by side along the first axis J1.

In this embodiment, the center O of the piezoelectric sensor section 6 is located on a line segment connecting the two pre-compressing bolts 9. However, the position of the center O of the piezoelectric sensor section is not limited to this and may deviate from the line segment connecting the two pre-compressing bolts 9.

The voltages V1 and V2 output from an ideal analog circuit board 4 are proportional to accumulation amounts of the electric charges Q1 and Q2 output from the piezoelectric sensor element 7. However, in an actual analog circuit board 4, for example, a leak current flowing into the capacitors 42 from the switching elements 43 occurs. Such a leak current becomes output drifts included in the voltages V1 and V2. The output drifts are errors in a measurement result. Therefore, the leak current causes deterioration in detection accuracy of the force detecting device 1. Moreover, the leak current is a value peculiar to a switching element and changes according to an environment of use such as temperature and humidity. Therefore, it is difficult to compensate for the leak current beforehand.

Therefore, the force detecting device 1 according to this embodiment achieves a reduction in the influence due to the leak current, that is, the output drifts based on the electric charges Q1 and Q2 output from the piezoelectric sensor element 7.

In the piezoelectric sensor element 7, as explained above, the first electrode 701, the first sensor 71, the third electrode 703, the second sensor 72, and the fifth electrode 705 are laminated in this order along the holding direction SD. In FIG. 5, only four quartz plates, that is, the first quartz plate 711, the second quartz plate 713, the third quartz plate 721, and the fourth quartz plate 723 included in such a piezoelectric sensor element 7 are shown. The +X directions of the quartz plates are indicated by arrows. In FIGS. 5, 6, 11, 13, and 14, in particular, the +X direction of the first quartz plate 711 is represented as a "+X(1) direction", the +X direction of the second quartz plate 713 is represented as a "+X(2) direction", the +X direction of the third quartz plate 721 is represented as a "+X(3) direction", and the +X direction of the fourth quartz plate 723 is represented as a "+X(4) direction".

As shown in FIGS. 5 and 6, in the piezoelectric sensor element 7 according to this embodiment, the first quartz plate 711, the second quartz plate 713, the third quartz plate 721, and the fourth quartz plate 723 are laminated in this order. As explained above, the +X(1) direction of the first quartz plate 711 and the +X(2) direction of the second quartz plate 713 face opposite directions each other. As explained above, the +X(3) direction of the third quartz plate 721 and the +X(4) direction of the fourth quartz plate 723 face opposite directions each other. "Face opposite directions to each other" refers to a state in which an angle formed by the directions is 180°. However, a slight error is allowed for this angle. The error is set to, for example, approximately ±5°.

In the piezoelectric sensor element 7 according to this embodiment, an angle θ21 formed by the +X(2) direction of the second quartz plate 713 and the +J direction of the first axis J1 and an angle θ41 formed by the +X(4) direction of the fourth quartz plate 723 and the +J1 direction of the first axis J1 are different. That is, in FIG. 6, a relation of θ21≠θ41 holds between the angle θ21 formed by the +X(2) direction and the +J direction and the angle θ41 formed by the +X(4) direction and the +J1 direction. In FIG. 6, for convenience of illustration, the first axis J1 and the arrows indicating the +X directions are shown to be shifted not to overlap.

Further, in the piezoelectric sensor element 7 according to this embodiment, an angle θ22 formed by the +X(2) direction of the second quartz plate 713 and the +J2 direction of the second axis J2 and an angle θ42 formed by the +X(4) direction of the fourth quartz plate 723 and the +J2 direction of the second axis J2 are equal. That is, in FIG. 6, a relation of θ22=θ42 holds between the angle θ22 formed by the +X(2) direction and the +J2 direction and the angle θ42 formed by the +X(4) direction and the +J2 direction.

With the force detecting device 1 in which such relations hold, it is possible to equalize conversion sensitivity in the conversion output circuit 401 that converts the electric charge Q1 into the voltage V1 and conversion sensitivity in the conversion output circuit 402 that converts the electric charge Q2 into the voltage V2. This is because the force detecting direction D1 of the first sensor 71 and the force detecting direction D2 of the second sensor 72 satisfy a relation of so-called line symmetry with the second axis J2 set as an axis of symmetry. If the conversion sensitivities are equal in this way, an output drift (a zero point drift)

superimposed on the voltage V1 and an output drift (a zero point drift) superimposed on the voltage V2 are equal. Therefore, the output drifts can be offset by calculating a difference between the voltage V1 and the voltage V2 in the arithmetic operation section 52. That is, the force detecting device 1 has a function of compensating for the output drifts. As a result, it is possible to detect a translational force component in the γ-axis direction at high detection accuracy based on voltage signals in which the output drifts are cancelled.

In particular, in this embodiment, θ21=0° and θ41=180°. With such a piezoelectric sensor element 7, the force detecting direction D1 of the first sensor 71 and the force detecting direction D2 of the second sensor 72 face opposite directions each other on the first axis J1. Therefore, a sign of the electric charge Q1 output from the first sensor 71 and a sign of the electric charge Q2 output from the second sensor 72 when an external force in the y-axis direction is applied to the force detecting device 1 are different. As a result, signs of the voltages V1 and V2 converted by the analog circuit board 4 are also different from each other. Therefore, changes in the voltages V1 and V2 can be amplified by calculating the difference between the voltage V1 and the voltage V2 in the arithmetic operation section 52. In other words, since signs of the voltage V1 and the voltage V2 are different from each other but waveforms of the voltage V1 and the voltage V2 are substantially equal, it is possible to amplify the waveforms by calculating the difference. As a result, it is possible to detect a translational force component in the γ-axis direction at high detection accuracy based on amplified voltage signals.

In this embodiment, θ22=θ42=90°. That is, the angle θ22 formed by the +X(2) direction of the second quartz plate 713 and the +J2 direction of the second axis J2 and the angle θ42 formed by the +X(4) direction of the fourth quartz plate 723 and the +J2 direction of the second axis J2 are respectively 90°. With such a piezoelectric sensor element 7, both of the force detecting direction D1 of the first sensor 71 and the force detecting direction D2 of the second sensor 72 are parallel to the first axis J1. Therefore, when it is attempted to detect a force in a direction parallel to the first axis J1, it is possible to detect the force in the first sensor 71 and the second sensor 72 without decomposing the force into a component in a direction different from the direction of the force. Therefore, since deterioration in detection accuracy involved in the decomposition does not occur, it is possible to perform force detection with higher accuracy. However, a slight error is allowed for the angles. The error is set to, for example, approximately ±5°. That is, even when the angles involve deviation within this error range, the angles can be set within the range of the concept of θ22=θ42.

In the force detecting device 1, as explained above, the first sensor 71 and the second sensor 72 are laminated in the α-axis direction. Therefore, compared with when the first sensor 71 and the second sensor 72 are separated, a reduction in the size of the piezoelectric sensor element 7 can be achieved. Eventually, a reduction in the size of the force detecting device 1 can be achieved.

Since there is almost no physical distance between the first sensor 71 and the second sensor 72, the magnitudes of shearing forces generated in the first sensor 71 and the second sensor 72 are substantially equal to each other. As a result, the detection accuracy of the force detecting device 1 can be further improved.

Further, the conversion output circuit 401 and the conversion output circuit 402 can be formed in the same element such as an IC by reducing the physical distance between the first sensor 71 and the second sensor 72. Consequently, in particular, the conversion sensitivity of the conversion output circuit 401 and the conversion sensitivity of the conversion output circuit 402 can be equalized. As a result, the output drifts can be more accurately offset.

In addition, a wiring length and a wiring path between the first sensor 71 and the conversion output circuit 401 and a wiring length and a wiring path between the second sensor 72 and the conversion output circuit 402 can be set close to each other. Consequently, noises superimposed on the wires are also the same degree each other. Therefore, the noises are also easily offset by the arithmetic operation by the arithmetic operation section 52.

In the force detecting device 1, the pre-compression in the holding direction SD is applied to the piezoelectric sensor element 7. The force detecting direction D1 of the first sensor 71 and the force detecting direction D2 of the second sensor 72 are respectively orthogonal to the holding direction SD. Therefore, a change in the pre-compression involved in a temperature change or the like does not affect the electric charge Q1 output from the first sensor 71 and the electric charge Q2 output from the second sensor 72. Therefore, since the force detecting device 1 is less easily affected by an environmental change, the force detecting device 1 can realize high detection accuracy.

As explained above, the force detecting device 1 is the force detecting device having the first axis J1 and the second axis J2 orthogonal to each other, the first axis J1 being the force detection axis. The force detecting device 1 includes the laminated body formed by laminating the first electrode 701, the first quartz plate 711, which is a Y-cut quartz plate, the second electrode 712, the second quartz plate 713, which is a Y-cut quartz plate, the third electrode 703, the third quartz plate 721, which is a Y-cut quartz plate, the fourth electrode 722, the fourth quartz plate 723, which is a Y-cut quartz plate, and the fifth electrode 705 in this order and the force detection circuit 50 configured to detect a force in the direction of the first axis J1 based on the electric charge Q1 output from the second electrode 712 and the electric charge Q2 output from the fourth electrode 722. When an electrical axis of the Y-cut quartz plate is set as the X axis, the +X(1) direction of the first quartz plate 711 and the +X(2) direction of the second quartz plate 713 face opposite directions. The +X(3) direction of the third quartz plate 721 and the +X(4) direction of the fourth quartz plate 723 face opposite directions. The angle θ21 formed by the +X(2) direction of the second quartz plate 713 and the +J1 direction, which is one direction of the first axis J1, and the angle θ41 formed by the +X(4) direction of the fourth quartz plate 723 and the +J direction, which is the one direction of the first axis J1, are different. Further, the angle θ22 formed by the +X(2) direction of the second quartz plate 713 and the J2 direction, which is one direction of the second axis J2, and the angle θ42 formed by the +X(4) direction of the fourth quartz plate 723 and the +J2 direction, which is the one direction of the second axis J2, are equal.

With such a force detecting device 1, it is possible to realize high detection accuracy with the function of compensating for output drifts and easily realize a reduction in the size of the force detecting device 1.

In this specification, the "one direction" means, in the first axis J1 and the second axis J2 orthogonal to each other, the direction of one of axes extending infinitely in opposite directions each other from an intersection of the first axis J1 and the second axis J2. Therefore, in the above explanation, since the +J1 direction and the +J2 direction are set as the "one directions" of the axes, the −J1 direction and the −J2 direction are "−directions".

The function of compensating for output drifts of the force detecting device 1 is explained with reference to FIGS. 8 and 9.

Figure 8:
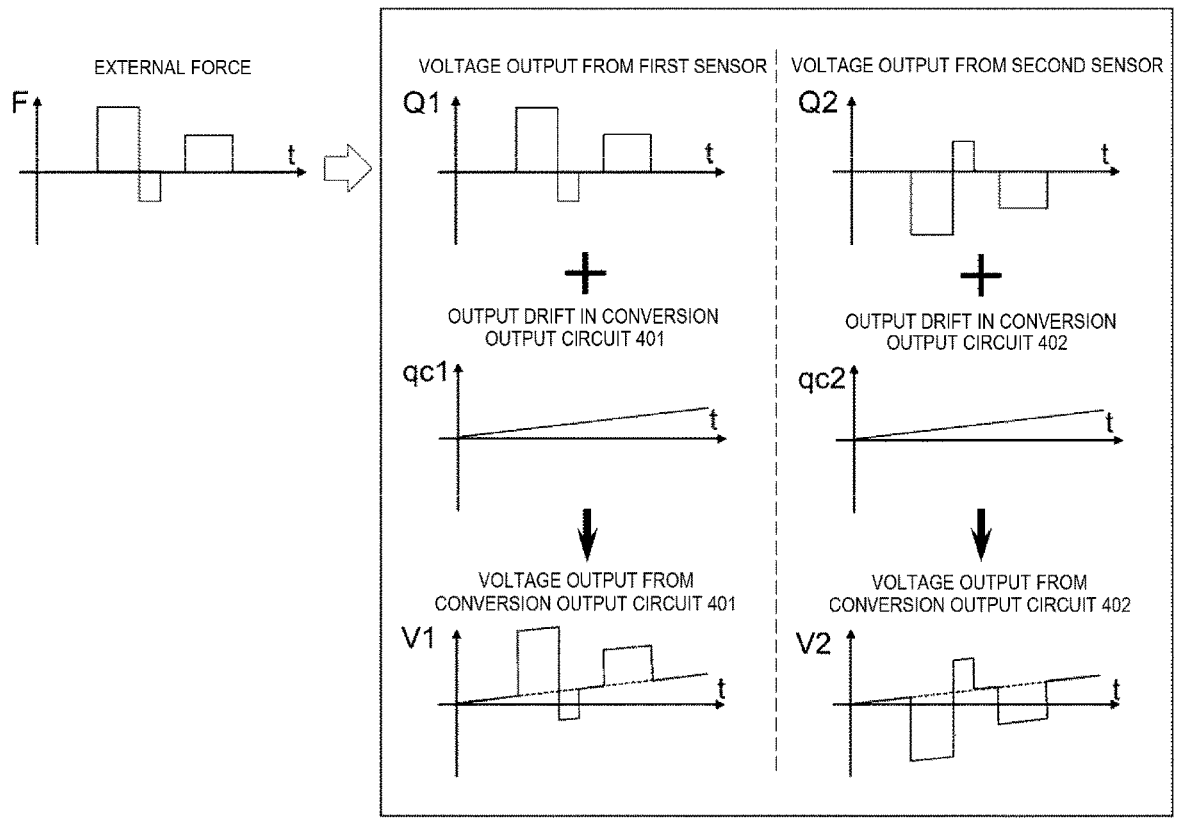
FIG. 8 is a diagram showing a change in an electric charge output from the first sensor, a change in an output drift in a conversion output circuit, and a change in a voltage output from the conversion output circuit and a change in an electric charge output from a second sensor, a change in an output drift in the conversion output circuit, and a change in a voltage output from the conversion output circuit when an external force changing in a predetermined waveform is applied to the force detecting device shown in FIG. 7.

FIG. 8 is a diagram showing a change in the electric charge Q1 output from the first sensor 71, a change in an output drift qc1 in the conversion output circuit 401, and a change in the voltage V1 output from the conversion output circuit 401 and a change in the electric charge Q2 output from the second sensor 72, a change in an output drift qc2 in the conversion output circuit 402, and a change in the voltage V2 output from the conversion output circuit 402 when an external force F changing in a predetermined waveform is applied to the force detecting device 1 shown in FIG. 7.

As shown in FIG. 8, it is assumed that the external force F changing in a rectangular wave shape according to elapse of time t is applied to the force detecting device 1.

At this time, the electric charge Q1 having a rectangular wave-shaped waveform that temporally changes according to the external force F is output from the first sensor 71. In the conversion output circuit 401, the output drift qc1 having a linear waveform that gradually increases according to elapse of time occurs. As a result, a waveform of the voltage V1 output from the conversion output circuit 401 changes to a waveform obtained by superimposing the linear waveform on the rectangular wave-shaped waveform.

On the other hand, the electric charge Q2 having the rectangular wave-shaped waveform that temporally changes according to the external force F is output from the second sensor 72. In the conversion output circuit 402, the output drift qc2 having a linear waveform that gradually increases according to the elapse of time occurs in the conversion output circuit 402. As a result, the waveform of the voltage V2 output from the conversion output circuit 402 changes to a waveform obtained by superimposing the linear waveform on the rectangular wave-shaped waveform.

Figure 9:
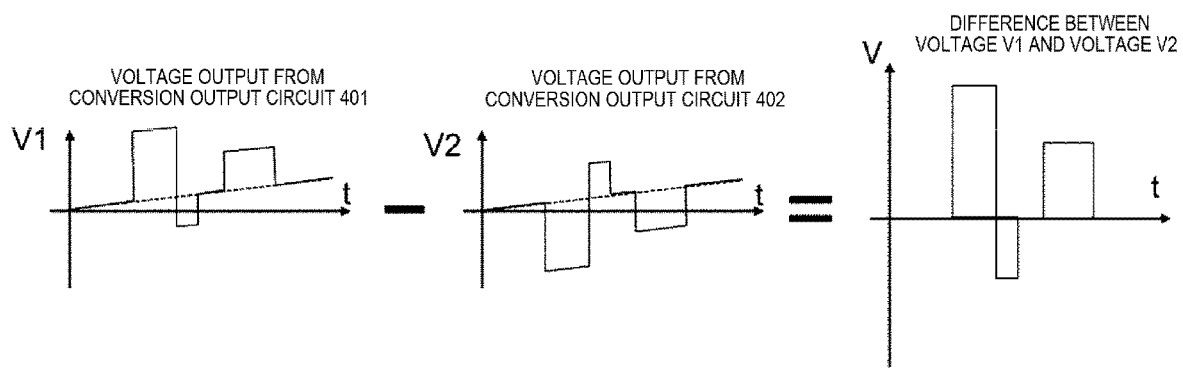
FIG. 9 is a diagram for explaining an arithmetic operation example in an arithmetic operation section shown in FIG. 7.
Figure 10:
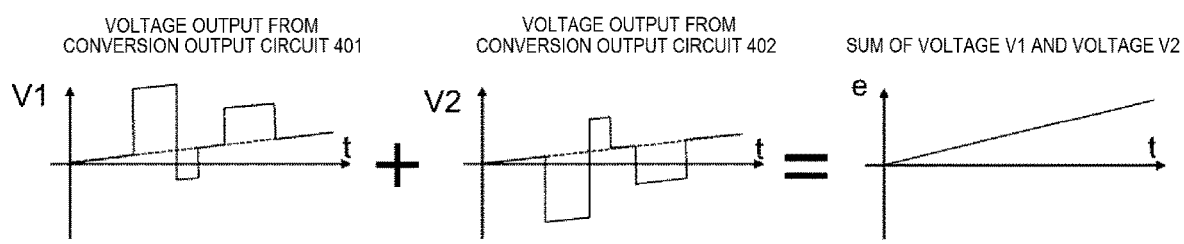
FIG. 10 is a diagram for explaining an arithmetic operation example in the arithmetic operation section shown in FIG. 7.

FIGS. 9 and 10 are respectively diagrams for explaining arithmetic operation examples in the arithmetic operation section 52 shown in FIG. 7.

As explained above, the arithmetic operation section 52 performs an arithmetic operation for calculating a difference V between the voltage V1 output from the conversion output circuit 401 and the voltage V2 output from the conversion output circuit 402. Sings of the voltage V1 and the voltage V2 are different from each other but waveforms of the voltage V1 and the voltage V2 are substantially equal. Therefore, it is possible to increase the absolute value of the amplitude of a waveform and more highly accurately detect the external force F by calculating the difference between the voltage V1 and the voltage V2 in the arithmetic operation section 52 as shown in FIG. 9.

In FIG. 10, an arithmetic operation for calculating a sum of the voltage V1 and the voltage V2 in the arithmetic operation section 52 is shown. Since the signs of the voltage V1 and the voltage V2 are different from each other but the waveforms of the voltage V1 and the voltage V2 are substantially equal as explained above, components based on the electric charges Q1 and Q2 can be offset by calculating the sum of the voltage V1 and the voltage V2. As a result, a temporal change of a sum "e" of a component based on the output drift qc1 superimposed on the voltage V1 and a component based on the output drift qc2 superimposed on the voltage V2 is calculated. A waveform of the temporal change of the sum "e" is usually a linear waveform as shown in FIG. 10. Therefore, such a waveform supports the fact that the force detecting device is normally functioning. On the other hand, when the waveform of the temporal change of the sum "e" is a waveform other than the linear waveform, this indicates that an abnormality occurs in any part of the force detecting device 1. Therefore, the arithmetic operation section 52 can perform, based on such a waveform of the temporal change of the sum "e", abnormality determination processing for determining whether an abnormality occurs in the force detecting device 1.

That is, the force detection circuit 50 has a function of determining presence or absence of an abnormality of the force detecting device 1 based on a temporal change of the electric charge Q1 output from the second electrode 712 and a temporal change of the electric charge Q2 output from the fourth electrode 722. Consequently, for example, when an abnormality occurs in the first sensor 71 or the second sensor 72 and a value of the electric charge Q1 or the electric charge Q2 deviates from an original value, the components based on the electric charges Q1 and Q2 cannot be offset even if the sum "e" is calculated in the arithmetic operation shown in FIG. 10. That is, although the absolute values of the voltage V1 based on the electric charge Q1 and the voltage V2 based on the electric charge Q2 should be originally substantially equal, deviation occurs in the absolute values when some abnormality occurs. Therefore, even if the sum "e" is calculated, the components based on the electric charges Q1 and Q2 cannot be offset. Therefore, when the sum "e" is only the sum of the component based on the output drift qc1 and the component based on the output drift qc2 as explained above, specifically, has the linear waveform shown in FIG. 10, the force detection circuit 50 determines that the force detecting device 1 is "normal". When the sum "e" has a waveform other than the linear waveform, the force detection circuit 50 can determine that the force detecting device 1 is "abnormal".

Since the force detection circuit 50 has such a function, it is possible to stop the operation of the force detecting device 1, for example, when an abnormality occurs and inform the abnormality to a user. Therefore, it is possible to improve reliability of the force detecting device 1.

Second Embodiment

A force detecting device according to a second embodiment is explained.

Figure 11:
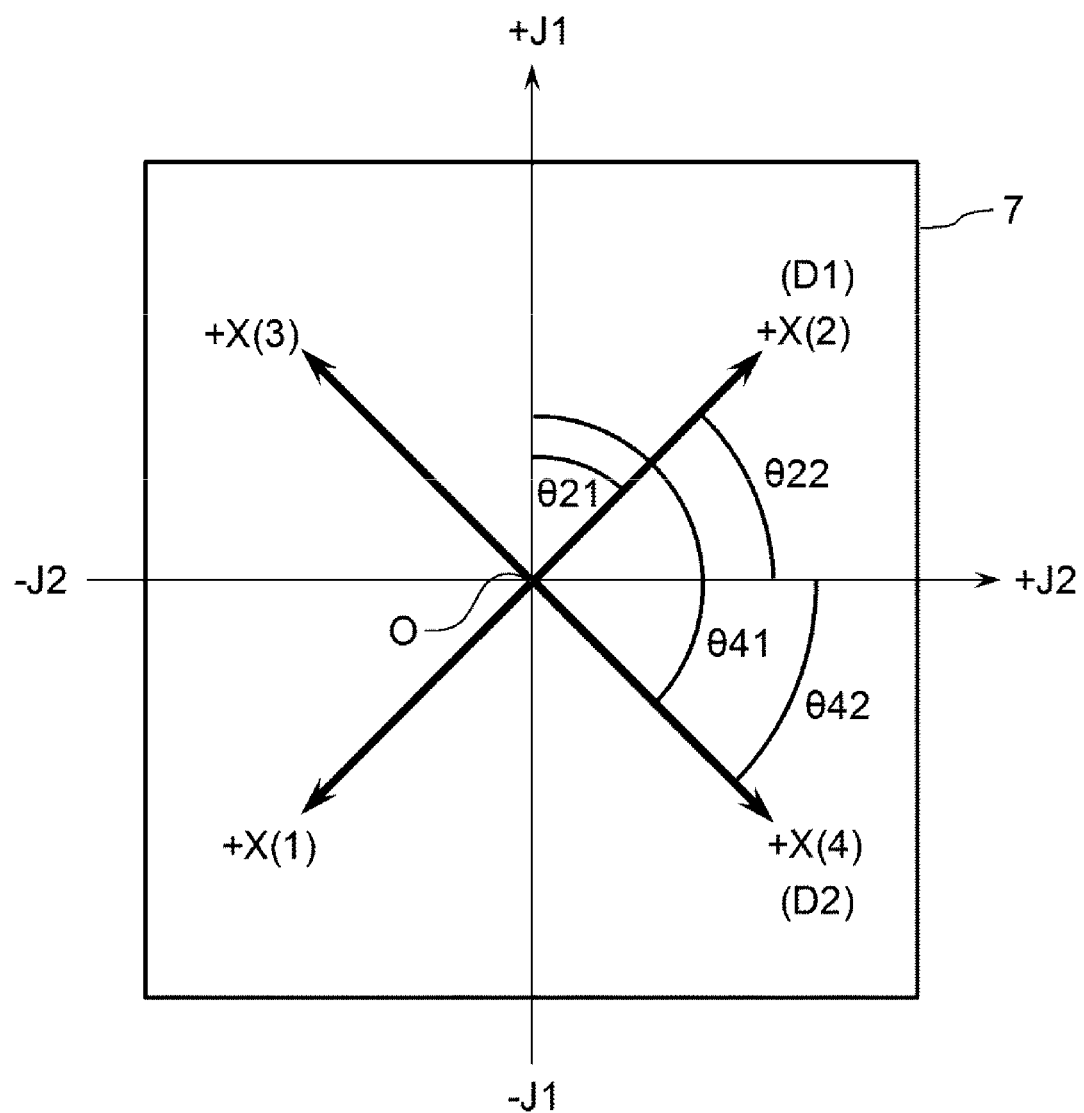
FIG. 11 is a schematic diagram showing a piezoelectric sensor element included in a force detecting device according to a second embodiment.
Figure 12:
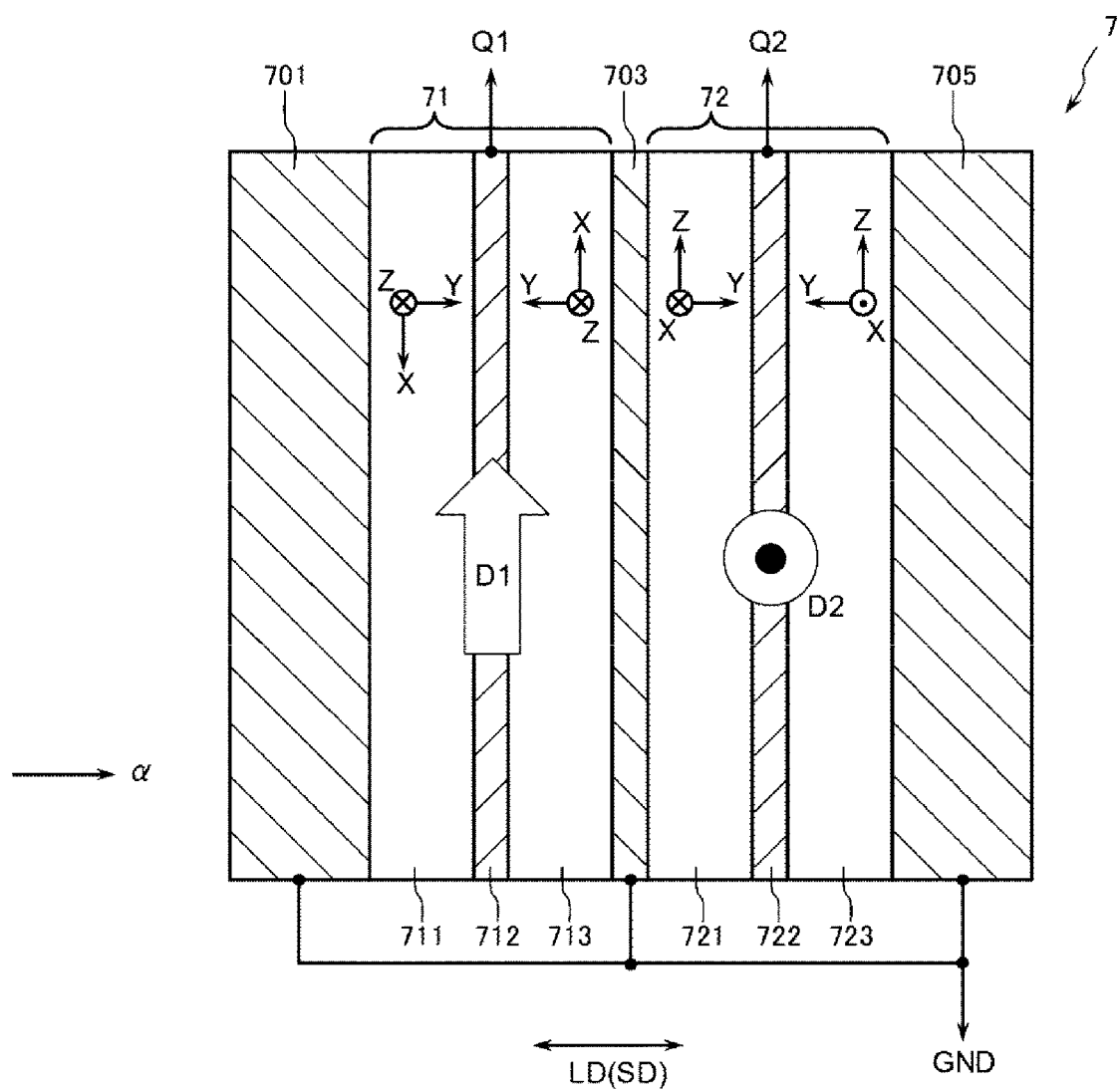
FIG. 12 is a sectional view of a piezoelectric sensor element shown in FIG. 11.

FIG. 11 is a schematic diagram showing a piezoelectric sensor element included in the force detecting device according to the second embodiment. FIG. 12 is a sectional view of the piezoelectric sensor element shown in FIG. 11. The sectional view of FIG. 12 is a sectional view of the piezoelectric sensor element shown in FIG. 11 taken along a plane, the normal direction of which is the +X(4) direction shown in FIG. 11.

The force detecting device 1 according to the second embodiment is explained centering on differences from the first embodiment. Explanation of similarities to the first embodiment is omitted. The same components as the components in the first embodiment are denoted by the same reference numerals and signs.

This embodiment is the same as the first embodiment except that mutual orientation of the first sensor 71 and the second sensor 72 is different. Specifically, whereas θ21=0° and θ41=180° in the first embodiment, in this embodiment, θ21=45° and θ41=135° as shown in FIG. 11. Therefore, a relation of θ21≠θ41 holds. Whereas θ22=θ42=90° in the first embodiment, in this embodiment, θ22=θ42=45°. Therefore, a relation of θ22=θ42 holds.

That is, in this embodiment, the angle θ22 formed by the +X(2) direction of the second quartz plate 713 and the +J2 direction of the second axis J2 and the angle θ42 formed by the +X(4) direction of the fourth quartz plate 723 and the +J2 direction of the second axis J2 are respectively 45°. With such a piezoelectric sensor element 7, for example, when it is attempted to detect a force in a direction parallel to the first axis J1, it is possible to detect the force in the first sensor 71 and the second sensor 72 by decomposing the force into components the +X(2) direction and the +X(4) direction. However, a slight error is allowed for the angles. The error is set to, for example, approximately ±5°.

In this embodiment, as in the first embodiment, the force detecting direction D1 of the first sensor 71 and the force detecting direction D2 of the second sensor 72 satisfy the relation of line symmetry with the second axis J2 set as the axis of symmetry. This makes it possible to equalize conversion sensitivity in the conversion output circuit 401 that converts the electric charge Q1 into the voltage V1 and conversion sensitivity in the conversion output circuit 402 that converts the electric charge Q2 into the voltage V2. If the conversion sensitivities are equal in this way, an output drift (a zero point drift) superimposed on the voltage V1 and an output drift (a zero point drift) superimposed on the voltage V2 are equal. Therefore, the output drifts can be offset by calculating a difference between the voltage V1 and the voltage V2 in the arithmetic operation section 52. As a result, it is possible to detect a translational force component in the γ-axis direction at high detection accuracy based on voltage signals in which the output drifts are cancelled.

Figure 13:
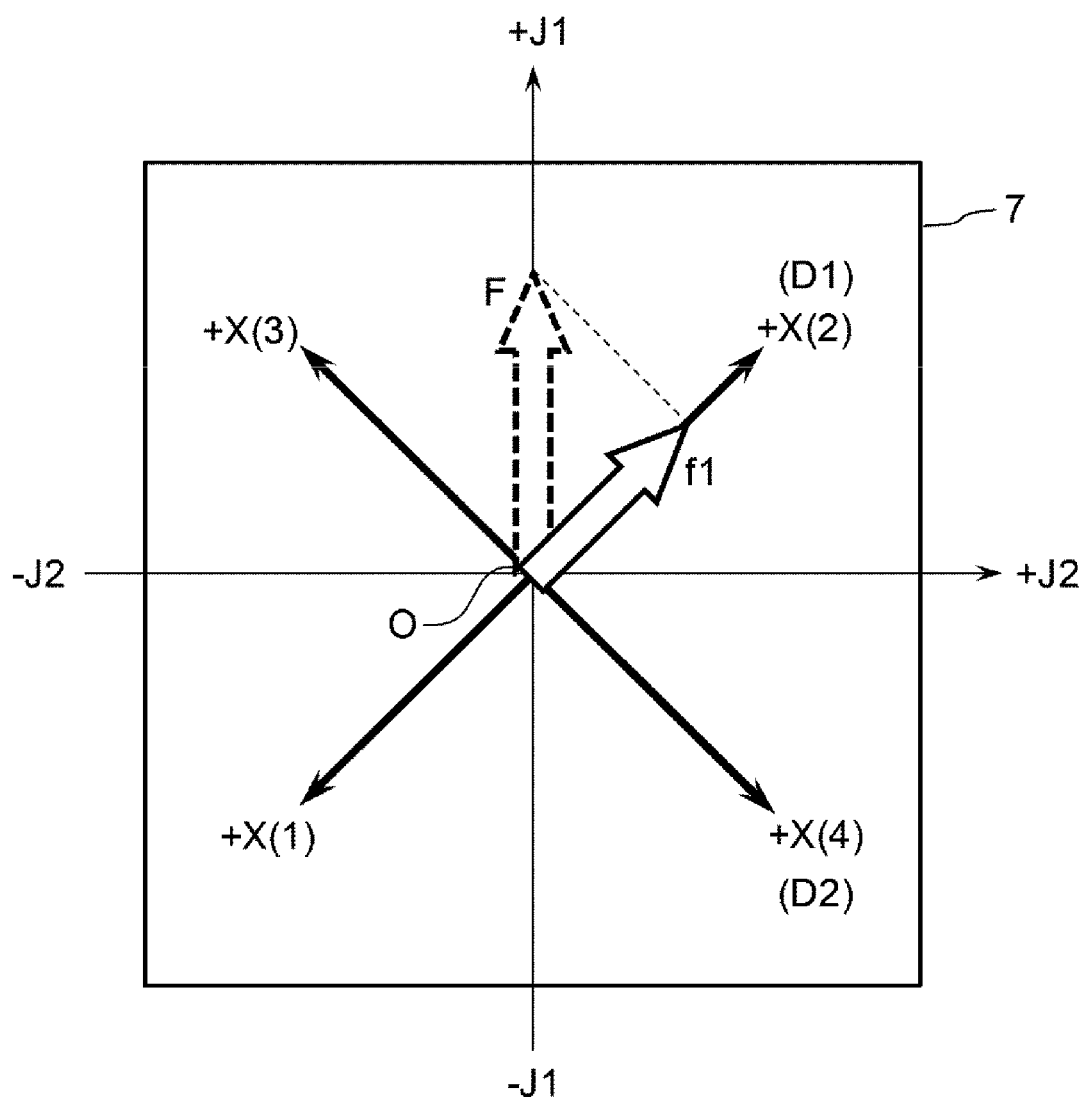
FIG. 13 is a diagram showing a state in which, when an external force in a y-axis direction is applied to the piezoelectric sensor element shown in FIG. 11, the external force is decomposed into a component in a +X direction of a second quartz plate.
Figure 14:
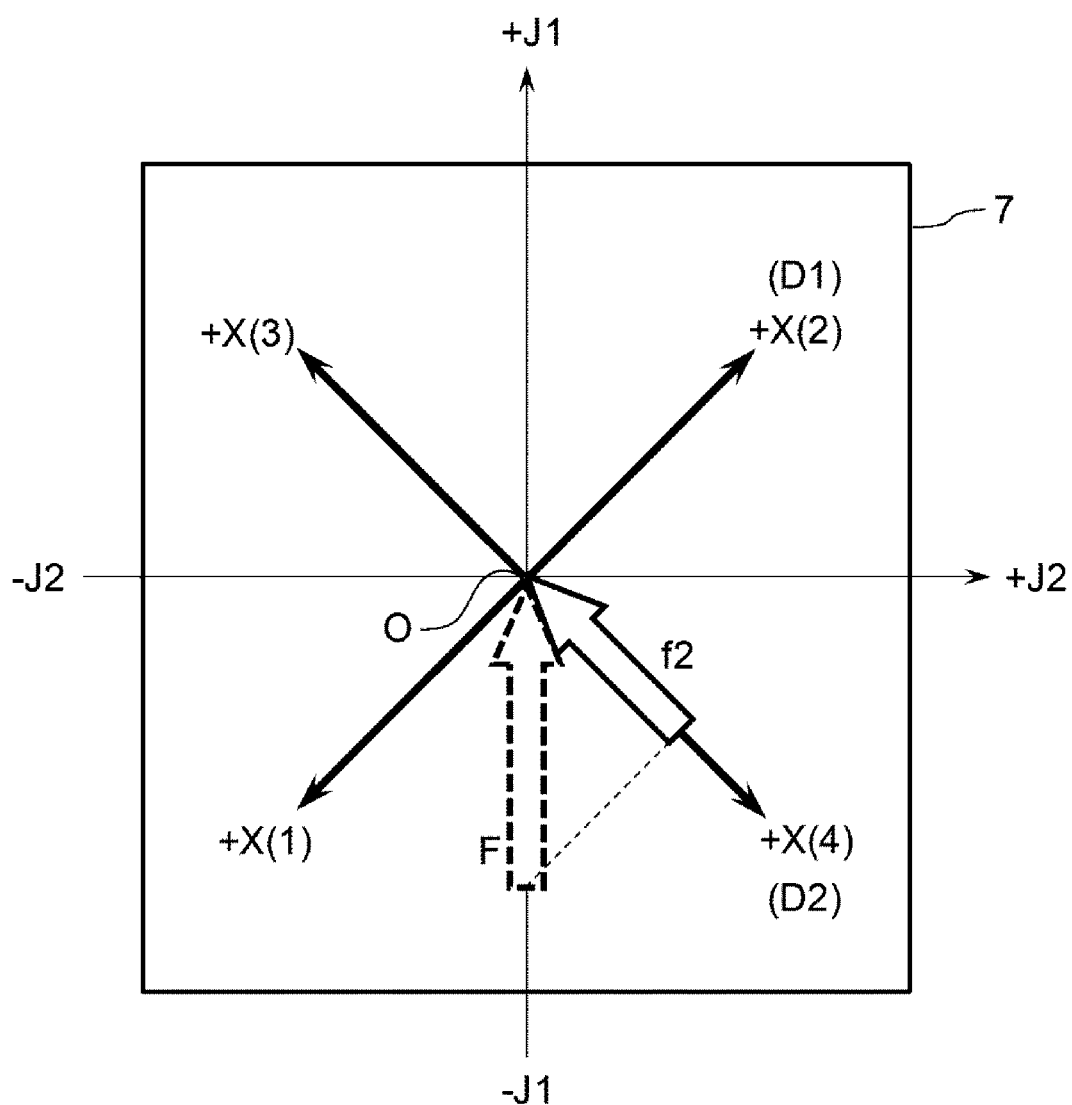
FIG. 14 is a diagram showing a state in which, when the external force in the y-axis direction is applied to the piezoelectric sensor element shown in FIG. 11, the external force is decomposed into a component in a +X direction of a fourth quartz plate.

FIG. 13 is a diagram showing a state in which, when the external force F in the γ-axis direction is applied to the piezoelectric sensor element shown in FIG. 11, the external force F is decomposed into a component in the +X(2) direction, that is, a component f1 in the force detecting direction D1. FIG. 14 is a diagram showing a state in which, when the external force F in the γ-axis direction is applied to the piezoelectric sensor element shown in FIG. 11, the external force F is decomposed into a component in the +X(4) direction, that is, a component f2 in the detecting direction D2.

As shown in FIGS. 13 and 14, in this embodiment, when the external force F is applied, the external force F can be decomposed into the component f1 and the component f2. Consequently, when the external force F is applied, a positive electric charge Q1 is output from the first sensor 71 to which the component f1, which is a component of force of the external force F, is applied and a negative electric charge Q2 is output from the second sensor 72 to which the component f2, which is a component of force of the external force F, is applied. As a result, signs of the voltages V1 and V2 converted by the analog circuit board 4 are different from each other. Therefore, changes in the voltages V1 and V2 can be amplified by calculating the difference between the voltage V1 and the voltage V2 in the arithmetic operation section 52. In other words, since signs of the voltage V1 and the voltage V2 are different from each other but waveforms of the voltage V1 and the voltage V2 are substantially equal, it is possible to amplify the waveforms by calculating the difference. As a result, it is possible to detect a translational force component in the γ-axis direction at high detection accuracy based on amplified voltage signals.

In the force detecting device 1, as explained above, the first sensor 71 and the second sensor 72 are laminated in the α-axis direction. Therefore, compared with when the first sensor 71 and the second sensor 72 are separated, a reduction in the size of the piezoelectric sensor element 7 can be achieved. Eventually, a reduction in the size of the force detecting device 1 can be achieved.

Since there is almost no physical distance between the first sensor 71 and the second sensor 72, the magnitudes of shearing forces generated in the first sensor 71 and the second sensor 72 are substantially equal to each other. As a result, the detection accuracy of the force detecting device 1 can be further improved.

Further, the conversion output circuit 401 and the conversion output circuit 402 can be formed in the same element such as an IC by reducing the physical distance between the first sensor 71 and the second sensor 72. Consequently, in particular, the conversion sensitivity of the conversion output circuit 401 and the conversion sensitivity of the conversion output circuit 402 can be equalized. As a result, the output drifts can be more accurately offset.

In addition, a wiring length and a wiring path between the first sensor 71 and the conversion output circuit 401 and a wiring length and a wiring path between the second sensor 72 and the conversion output circuit 402 can be set close to each other. Consequently, noises superimposed on the wires are also the same degree each other. Therefore, the noises are also easily offset by the arithmetic operation by the arithmetic operation section 52.

The same effects as the effects of the first embodiment explained above can be obtained by the second embodiment.

Third Embodiment

Figure 15:
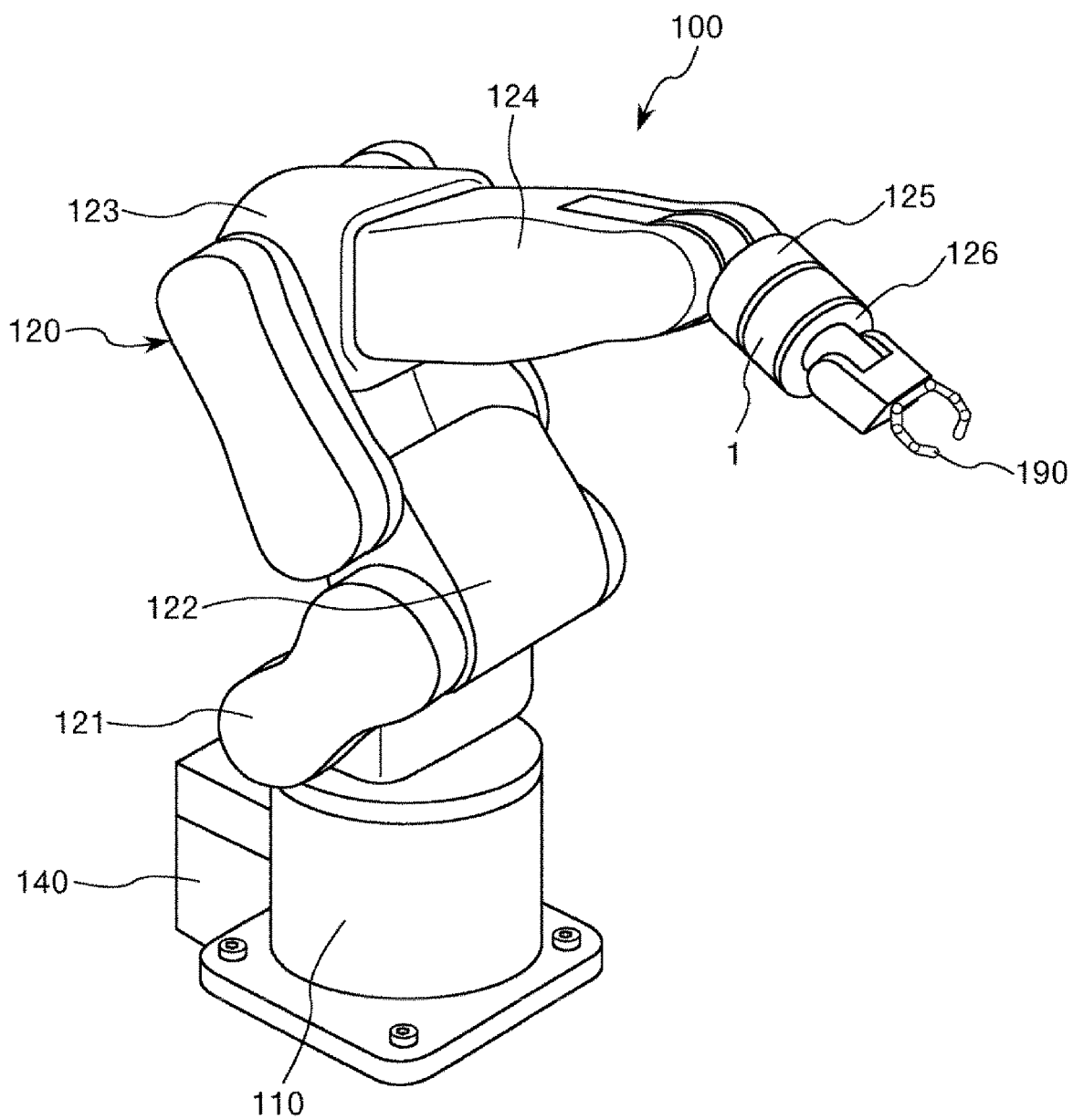
FIG. 15 is a perspective view showing a robot according to a third embodiment.
Figure 16:
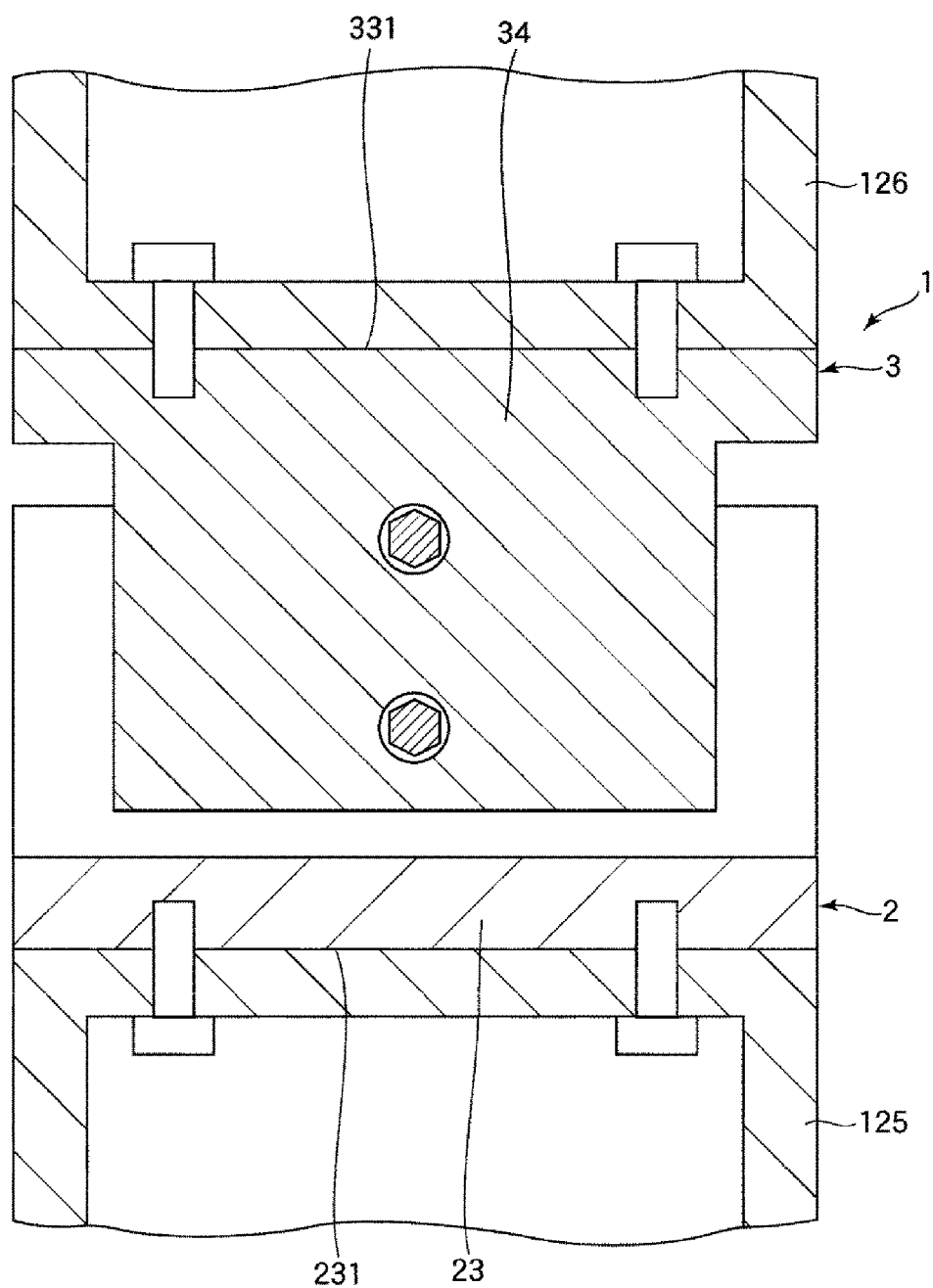
FIG. 16 is a partially enlarged sectional view of the robot shown in FIG. 15.

FIG. 15 is a perspective view showing a robot according to a third embodiment. FIG. 16 is a partially enlarged sectional view of the robot shown in FIG. 15.

The robot 100 shown in FIG. 15 is, for example, a robot that can be used in a manufacturing process for manufacturing an industrial product such as a precision instrument. As shown in FIG. 15, the robot 100 includes a base 110 functioning as a base fixed to, for example, a floor or a ceiling, an arm 120 turnable with respect to the base 110, an end effector 190 provided at the distal end of the arm 120, and a robot control section 140 that controls driving of the arm 120 and the end effector 190.

The arm 120 includes a first arm 121 turnably coupled to the base 110, a second arm 122 turnably coupled to the first arm 121, a third arm 123 turnably coupled to the second arm 122, a fourth arm 124 turnably coupled to the third arm 123, a fifth arm 125 turnably coupled to the fourth arm 124, and a sixth arm 126 turnably coupled to the fifth arm 125. A hand coupling section is provided in the sixth arm 126. The end effector 190 is attached to the hand coupling section.

The force detecting device 1 explained above is provided in such a robot 100 as a sensor that detects an external force applied to the end effector 190. As the force detecting device 1, for example, the first embodiment or the second embodiment can be used.

Specifically, as shown in FIG. 16, the force detecting device 1 is fixed to the arm 120 such that the first base 2 is located on the proximal end side of the arm 120 and the second base 3 is located on the distal end side of the arm 120. In this embodiment, the force detecting device 1 is located between the fifth arm 125 and the sixth arm 126. The first base 2 is coupled to the fifth arm 125 and the second base 3 is coupled to the sixth arm 126.

However, the disposition of the force detecting device 1 is not particularly limited. For example, the force detecting device 1 may be located between the sixth arm 126 and the end effector 190. The force detecting device 1 may be disposed such that the first base 2 is located on the distal end side of the arm 120 and the second base 3 is located on the proximal end side of the arm 120.

The force detecting device 1 feeds back a force detected by the force detecting device 1 to the robot control section 140, whereby the robot 100 can execute more precise work. The robot 100 can detect, with a force detected by the force detecting device 1, for example, contact of the end effector 190 with a work object or an obstacle. Therefore, it is possible to more properly perform operation such as gripping and movement of the work object by the end effector 190. It is possible to easily perform an obstacle avoiding operation, an object damage avoiding operation, and the like, which are difficult in the position control in the past. The robot 100 can more properly and safely execute work.

In this way, the robot 100 includes the force detecting device 1.

As explained above, the force detecting device 1 is the force detecting device having the first axis J1 and the second axis J2 orthogonal to each other, the first axis J1 being the force detection axis. The force detecting device 1 includes the laminated body formed by laminating the first electrode 701, the first quartz plate 711, which is a Y-cut quartz plate, the second electrode 712, the second quartz plate 713, which is a Y-cut quartz plate, the third electrode 703, the third quartz plate 721, which is a Y-cut quartz plate, the fourth electrode 722, the fourth quartz plate 723, which is a Y-cut quartz plate, and the fifth electrode 705 in this order and the force detection circuit 50 configured to detect a force in the direction of the first axis J1 based on the electric charge Q1 output from the second electrode 712 and the electric charge Q2 output from the fourth electrode 722. When an electrical axis of the Y-cut quartz plate is set as the X axis, the +X(1) direction of the first quartz plate 711 and the +X(2) direction of the second quartz plate 713 face opposite directions. The +X(3) direction of the third quartz plate 721 and the +X(4) direction of the fourth quartz plate 723 face opposite directions. The angle θ21 formed by the +X(2) direction of the second quartz plate 713 and the +J1 direction, which is one direction of the first axis J1, and the angle θ41 formed by the +X(4) direction of the fourth quartz plate 723 and the +J direction, which is the one direction of the first axis J1, are different. Further, the angle θ22 formed by the +X(2) direction of the second quartz plate 713 and the J2 direction, which is one direction of the second axis J2, and the angle θ42 formed by the +X(4) direction of the fourth quartz plate 723 and the +J2 direction, which is the one direction of the second axis J2, are equal.

With such a force detecting device 1, it is possible to realize high detection accuracy with the function of compensating for output drifts and easily realize a reduction in the size of the force detecting device 1. As a result, with the robot 100, the effects of the force detecting device 1 can be enjoyed. Therefore, the robot 100 has excellent reliability and a reduction in the size of the robot 100 can be easily achieved.

The configuration of the robot 100 is not particularly limited. For example, the number of arms may be different from the number of arms in this embodiment.

Fourth Embodiment

Figure 17:
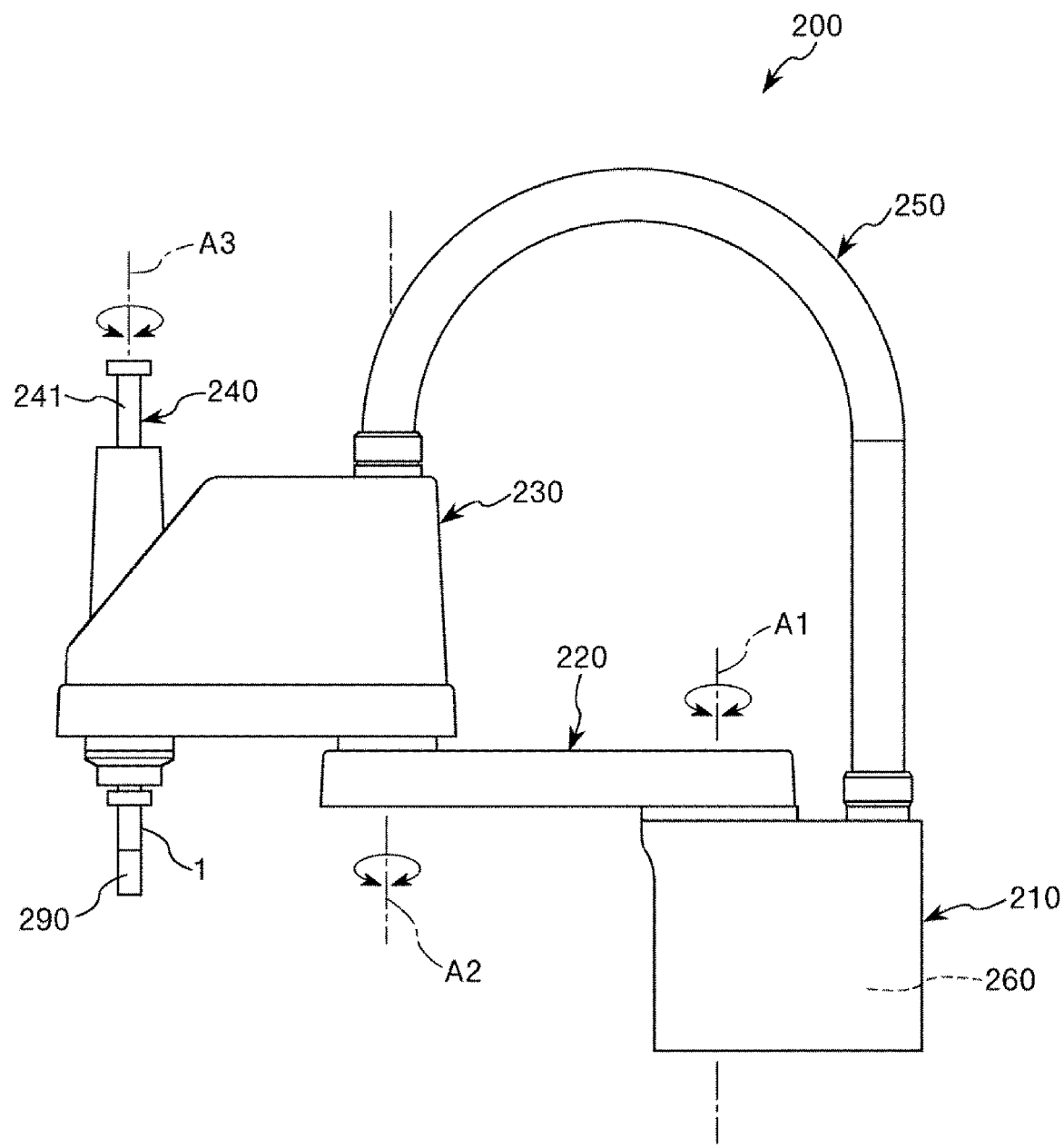
FIG. 17 is a side view showing a robot according to a fourth embodiment.

FIG. 17 is a side view showing a robot according to a fourth embodiment.

A robot 200 shown in FIG. 17 is a so-called horizontal articulated robot (a SCARA robot). The robot 200 is used in, for example, a manufacturing process for manufacturing a precision instrument or the like. The robot 200 can perform gripping, conveyance, and the like of the precision instrument, components, and the like. The robot 200 includes a base 210, a first arm 220, a second arm 230, a work head 240, a wire routing section 250, and a robot control section 260.

The base 210 is fixed to, for example, a not-shown floor surface by bolts or the like. The first arm 220 is coupled to the upper end portion of the base 210. The first arm 220 is turnable around, with respect to the base 210, an axis A1 extending along the vertical direction. The second arm 230 is coupled to the distal end portion of the first arm 220. The second arm 230 is turnable around, with respect to the first arm 220, an axis A2 extending along the vertical direction.

The work head 240 is disposed at the distal end portion of the second arm 230. The work head 240 includes a spline shaft 241 inserted through a spline nut and a ball screw nut coaxially disposed at the distal end portion of the second arm 230. The spline shaft 241 is turnable around, with respect to the second arm 230, an axis A3 extending along the vertical direction and is movable in the up-down direction. An end effector 290 is coupled to the distal end portion of the spline shaft 241.

The force detecting device 1 is provided in the robot 200 as a sensor that detects an external force applied to the end effector 290. As the force detecting device 1, for example, the first embodiment or the second embodiment can be used.

Specifically, the force detecting device 1 is provided between the spline shaft 241 and the end effector 290. The force detecting device 1 is fixed such that the first base 2 is located on the spline shaft 241 side and the second base 3 is located on the end effector 290 side. However, the disposition of the force detecting device 1 is not particularly limited. For example, the force detecting device 1 may be disposed such that the first base 2 is located on the end effector 290 side and the second base 3 is located on the spline shaft 241 side.

In this way, the robot 200 includes the force detecting device 1.

As explained above, the force detecting device 1 is the force detecting device having the first axis J1 and the second axis J2 orthogonal to each other, the first axis J1 being the force detection axis. The force detecting device 1 includes the laminated body formed by laminating the first electrode 701, the first quartz plate 711, which is a Y-cut quartz plate, the second electrode 712, the second quartz plate 713, which is a Y-cut quartz plate, the third electrode 703, the third quartz plate 721, which is a Y-cut quartz plate, the fourth electrode 722, the fourth quartz plate 723, which is a Y-cut quartz plate, and the fifth electrode 705 in this order and the force detection circuit 50 configured to detect a force in the direction of the first axis J1 based on the electric charge Q1 output from the second electrode 712 and the electric charge Q2 output from the fourth electrode 722. When an electrical axis of the Y-cut quartz plate is set as the X axis, the +X(1) direction of the first quartz plate 711 and the +X(2) direction of the second quartz plate 713 face opposite directions. The +X(3) direction of the third quartz plate 721 and the +X(4) direction of the fourth quartz plate 723 face opposite directions. The angle θ21 formed by the +X(2) direction of the second quartz plate 713 and the +J1 direction, which is one direction of the first axis J1, and the angle θ41 formed by the +X(4) direction of the fourth quartz plate 723 and the +J direction, which is the one direction of the first axis J1, are different. Further, the angle θ22 formed by the +X(2) direction of the second quartz plate 713 and the J2 direction, which is one direction of the second axis J2, and the angle θ42 formed by the +X(4) direction of the fourth quartz plate 723 and the +J2 direction, which is the one direction of the second axis J2, are equal.

With such a force detecting device 1, it is possible to realize high detection accuracy with the function of compensating for output drifts and easily realize a reduction in the size of the force detecting device 1. As a result, with the robot 200, the effects of the force output device 1 can be enjoyed. Therefore, the robot 200 has excellent reliability and a reduction in the size of the robot 200 can be easily achieved.

The force detecting device and the robot according to the present disclosure are explained above based on the embodiment shown in the figures. However, the present disclosure is not limited to the embodiments. The components of the sections can be replaced with any components having the same functions. Any other components may be added to the present disclosure. The embodiments may be combined as appropriate.

What is claimed is:

1. A force detecting device having a first axis and a second axis orthogonal to each other, the first axis being a force detection axis, the force detecting device comprising:
    a laminated body formed by laminating a first electrode, a first quartz plate, which is a Y-cut quartz plate, a second electrode, a second quartz plate, which is a Y-cut quartz plate, a third electrode, a third quartz plate, which is a Y-cut quartz plate, a fourth electrode, a fourth quartz plate, which is a Y-cut quartz plate, and a fifth electrode in this order; and
    a force detection circuit configured to detect a force in a direction of the first axis based on an electric charge output from the second electrode and an electric charge output from the fourth electrode, wherein
    when an electrical axis of the Y-cut quartz plate is set as an X axis,
    a +X direction of the first quartz plate and a +X direction of the second quartz plate face opposite directions,
    a +X direction of the third quartz plate and a +X direction of the fourth quartz plate face opposite directions,
    an angle formed by the +X direction of the second quartz plate and one direction of the first axis is different from an angle formed by the +X direction of the fourth quartz plate and the one direction of the first axis, and
    an angle formed by the +X direction of the second quartz plate and one direction of the second axis is equal to an angle formed by the +X direction of the fourth quartz plate and the one direction of the second axis.

2. The force detecting device according to claim 1, wherein the angle formed by the +X direction of the second quartz plate and the one direction of the second axis is 90° and the angle formed by the +X direction of the fourth quartz plate and the one direction of the second axis is 90°.

3. The force detecting device according to claim 1, wherein the angle formed by the +X direction of the second quartz plate and the one direction of the second axis is 45° and the angle formed by the +X direction of the fourth quartz plate and the one direction of the second axis is 45°.

4. The force detecting device according to claim 1, wherein the force detection circuit has a function of determining an abnormality of the force detecting device based on a temporal change of an electric charge output from the second electrode and a temporal change of an electric charge output from the fourth electrode.

5. A robot comprising a force detecting device having a first axis and a second axis orthogonal to each other, the first axis being a force detection axis,
    the force detecting device including:
    a laminated body formed by laminating a first electrode, a first quartz plate, which is a Y-cut quartz plate, a second electrode, a second quartz plate, which is a Y-cut quartz plate, a third electrode, a third quartz plate, which is a Y-cut quartz plate, a fourth electrode, a fourth quartz plate, which is a Y-cut quartz plate, and a fifth electrode in this order; and
    a force detection circuit configured to detect a force in a direction of the first axis based on an electric charge output from the second electrode and an electric charge output from the fourth electrode, wherein
    when an electrical axis of the Y-cut quartz plate is set as an X axis,
    a +X direction of the first quartz plate and a +X direction of the second quartz plate face opposite directions,
    a +X direction of the third quartz plate and a +X direction of the fourth quartz plate face opposite directions,
    an angle formed by the +X direction of the second quartz plate and one direction of the first axis is different from an angle formed by the +X direction of the fourth quartz plate and the one direction of the first axis, and
    an angle formed by the +X direction of the second quartz plate and one direction of the second axis is equal to an angle formed by the +X direction of the fourth quartz plate and the one direction of the second axis.

* * * * *